Jan. 26, 1971     R. R. HABERECHT     3,557,440
METHOD OF MAKING DIELECTRIC BODIES WITH SELECTIVELY
FORMED CONDUCTIVE OR METALLIC PORTIONS
AND COMPOSITES THEREWITH
Original Filed Sept. 18, 1964     6 Sheets-Sheet 1

INVENTOR
ROLF R. HABERECHT
BY
ATTORNEY

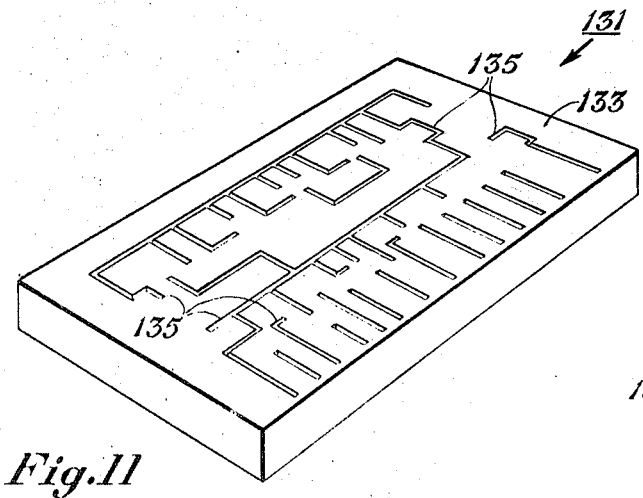
Fig.11
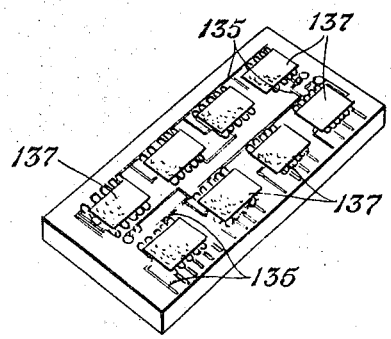
Fig.12
Fig.13
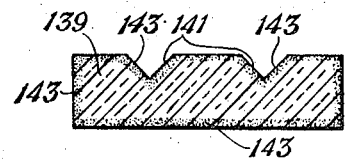
Fig.14
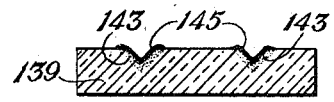
Fig.15
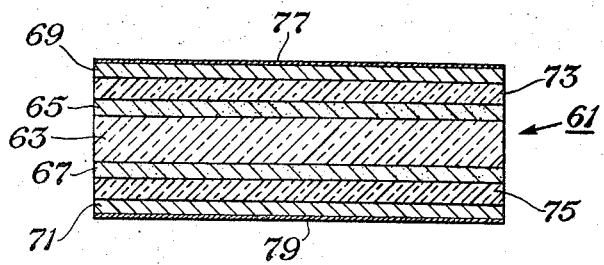
Fig.16
Fig.4a Jan. 26, 1971  R. R. HABERECHT  3,557,440
METHOD OF MAKING DIELECTRIC BODIES WITH SELECTIVELY
FORMED CONDUCTIVE OR METALLIC PORTIONS
AND COMPOSITES THEREWITH
Original Filed Sept. 18, 1964  6 Sheets-Sheet 3

INVENTOR
ROLF R. HABERECHT
BY
ATTORNEY

Jan. 26, 1971   R. R. HABERECHT   3,557,440
METHOD OF MAKING DIELECTRIC BODIES WITH SELECTIVELY
FORMED CONDUCTIVE OR METALLIC PORTIONS
AND COMPOSITES THEREWITH
Original Filed Sept. 18, 1964   6 Sheets-Sheet 4

INVENTOR
ROLF R. HABERECHT
BY
ATTORNEY

INVENTOR
ROLF R. HABERECHT
BY Robert J. Crawford
ATTORNEY

United States Patent Office 3,557,440
Patented Jan. 26, 1971

3,557,440
METHOD OF MAKING DIELECTRIC BODIES WITH SELECTIVELY FORMED CONDUCTIVE OR METALLIC PORTIONS AND COMPOSITES THEREWITH
Rolf R. Haberecht, Richardson, Tex., assignor to Texas Instruments Incorporated, Dallas, Tex., a corporation of Delaware
Original application Sept. 18, 1964, Ser. No. 398,480, now Patent No. 3,390,012, dated June 25, 1968. Divided and this application Jan. 5, 1968, Ser. No. 720,007
Int. Cl. B23k 31/02
U.S. Cl. 29—472.7
14 Claims

ABSTRACT OF THE DISCLOSURE

This application relates to a process of preparing a body having conductive and dielectric portions. A surface zone of a dielectric body is selectively reduced to a metal and a conductor is thereafter adhered to the selectively-reduced surface zone. The adhering may be accomplished by joining a conductor such as a metal or graphite to the reduced zone or by plating a metal on the conductive surface zone. Particularly, yttrium iron garnet is joined to a conductor by heating a surface region of the dielectric body in a reducing environment to a temperature not lower than 700° C. to reduce the surface region to a metal and joining a conductor to this reduced region. The conductor and dielectric to be joined may be placed into contact either before or after the surface reduction zone is formed.

This application relates to dielectric bodies with selectively formed conductive or metallic portions, and methods of making such bodies. Moreover, it relates to bodies with selectively formed portions having changed electrical and magnetic properties. In addition, it relates to composites of such bodies, including dielectric bodies, with semiconductor material, and to the method of making such composites. Such composites include solid-state integrated composite circuits or networks provided by circuitry in the body or dielectric material and in the semiconductor material.

This application is a division of patent application Ser. No. 398,480 field Sept. 18, 1964, now Pat. No. 3,390,012.

On numerous occasions it is desired that a dielectric body have a conductor or a metallic member firmly attached to it. For example, a securely attached insulating support is often needed for an electrode or a conductor; small conductors passing through dielectric headers must be supported and/or sealed; and circuit boards require conductive paths secured to a dielectric substrate. Applications are too numerous to specifically list and they are presented on a variety of scales, from miniaturized circuits and components on up to large size applications.

The prior art has utilized a multiplicity of means to provide support of conductors by dielectric bodies. For the most part, such supports have been purely mechanical in nature. On occasion a chemical means of joining a conductive substance to a dielectric body has been utilized. These various mechanical and chemical means are satisfactory for certain specific applications, but they possess certain marked disadvantages for many applications. For example, in some cases the junction or support structure between the dielectric and conductor does not possess the required strength for many applications; such prior structures also in many cases do not provide adequate sealing integrity required for hermetically sealed applications; such junction or support structures are also oftentimes prohibitively expensive and difficult to effect, requiring complex and multiple step high temperature processes; the integrity of the intended conductive path on a dielectric substrate is physically exposed to deterioration from chemical attach and/or structural damage; and for miniaturized applications, the dielectric substrate-conductor combination must be unduly large, and quality, both electrical and mechanical, varies widely and is hard to control within acceptable limits; to name but a few.

Making of electrically insulated hermetically sealed joints between feed through electrical conductors (or electrodes) and a metallic support (e.g., a header) in an economical and expedient fashion has also been a problem in the past.

Another problem often encountered in electronic applications is that of effecting satisfactory welding of electrical or electronic components to a conductive portion of a circuit on a dielectric substrate. This problem is more pronounced in miniaturized so-called printed circuit arrangements utilized in microelectronic applications. A good weldable conductive surface on a dielectric substrate is particularly desirable in these applications to facilitate automated and programmed fabrication and assembly of the components into a completed microelectronic circuit. In addition, the problem of providing a large amount of circuitry for printed circuit arrangements, including resistors, capacitors, and semiconductors network in a small area, and without running high risk of shorting, is often encountered.

It would be quite desirable if highly miniaturized circuits having a wide range of capabilities were available. While some miniaturized integrated circuits are provided in solid-state in semiconductor chips, the range of application is limited by the nature of the semiconductor material and fabrication techniques that may be employed. It would be desirable if a miniaturized solid-state circuit could be provided in a small, single solid structure that provided both the electrical and magnetic properties and functions of certain dielectrics, for example, ferromagnetic properties, and the properties and functions of semiconductor materials. Such a structure might then provide integrated circuits employing the functions of both types of materials, having utility, for example, in microwave applications.

The prior art has not provided an acceptable miniaturized integrated circuit which includes one or more inductors. For example, silicon chip solid-state circuits have not been capable of practically providing a highly miniaturized inductor within the chip circuit.

Nor has the prior art provided bodies which may be autogenously changed to selectively change the magnetic properties of portions of the body to a predetermined degree and in accordance with a predetermined pattern.

It is an object of this invention to provide bodies with selectively and integrally formed portions having changed electrical and magnetic properties, and to provide methods for accomplishing such change.

It is another object of this invention to provide dielectric bodies with selectively and integrally formed conductive or metallic portions that meet the needs referred to above and deficiencies mentioned.

Moreover, it is an object to provide circuits or portions thereof that are integrally or autogenously formed from a dielectric substrate, such circuits including inductors, as well as resistors or capacitors.

More specifically it is an object of this invention to provide a dielectric body that has conductive integral portions of high structural integrity and that may be easily formed on desired zones of the dielectric body.

It is a further and more specific object to provide such dielectric bodies having selectively formed integral conductive portions thereon which may be easily joined securely as by welding or soldering to external conductors or components if desired.

Another specific object is to provide a dielectric substrate which has integral electrically conductive portions or zones which may be disposed in a desired predetermined pattern and which may have a desired predetermined degree of conductivity, either of uniform value over the pattern, or a conductivity of desired variation at different locations on the predetermined pattern.

It is another object of this invention to provide selectively formed conductive paths strongly joined to a dielectric substrate which paths provide good welding surfaces to facilitate economic and expedient fabrication and assembly of circuit components and electrical interconnections on said substrate and which is particularly suited for automated fabrication and assembly techniques.

It is an object to provide a simple and efficient method of making structure that achieves the foregoing objects.

It is a further object to provide a composite body of dielectric material and semiconductor material, and to provide such a composite body carrying a solid-state integrated composite circuit capable of taking advantage of various of the properties of both materials.

In accordance with the present invention a unitary body comprising a dielectric portion having a relatively conductive zone integral with and formed from said dielectric portion is provided. The conductivity of the relatively conductive zone may be of predetermined value, depending on the conditions under which the dielectric portion is formed.

Furthermore, the present invention provides a process for preparing a unitary body having a dielectric portion with a comparatively conductive zone integral therewith. Such process comprises chemically reducing a surface zone of a unitary, crystalline dielectric body so that said surface zone is made relatively conductive.

In a preferred embodiment, a dielectric body can be provided with a relatively conductive portion by the simple step of reducing a surface zone of a unitary, crystalline, non-metallic, dielectric body so that said surface zone is made relatively metallic and conductive. The conductivity of this portion can be improved if desired by subsequently adhering a metallic conductor as by plating to said relatively metallic, conductive surface zone.

A preferred embodiment of this invention comprises a dielectric body having a relatively conductive zone integral with and formed from said dielectric body, and having a conductor adhered to said relatively conductive zone.

In one preferred embodiment of the present invention the dielectric body is joined to a semiconductor body to provide a composite body of the two. Such a composite body may be provided with cooperative circuitry, a part autogenously formed in the dielectric body, and a part carried by the semiconductor body.

An aspect of the present invention provides autogenously formed passive components in a dielectric substrate, such components including not only resistors and capacitors, but inductors as well. The fomation is accomplished by localized reduction, preferably with a concentrated energy source such as an electron beam.

An embodiment of the present invention provides for the joining of a reducible dielectric body and a semiconductor body. Such joining includes the specific methods of fusion through heat, joining by high pressure contact between surfaces, joining through deposition of one of the materials on the other from the vapor phase, and joining through an intermediate metal member which forms bonds with both bodies. Good electrical contact may be made between conductive paths in the dielectric body and desired circuitry carried by the semiconductor body, including transistor regions, either during the course of the joining of the two bodies, or after. Moreover, circuitry in the dielectric body, including components, may be formed either before or after the joining of the two bodies. In a quite specific preferred embodiment, the dielectric body is made of yttrium iron garnet.

In a specific preferred embodiment, this invention provides a process for reducing a unitary body of yttrium iron garnet to form a relatively conductive surface zone. In accordance with one aspect, a comparatively heavy or severe chemical reduction is carried out, while in accordance with an alternative aspect, the reduction is light and is carried out under comparatively mild reducing conditions. In the former instance, the surface zone resulting from the heavy reduction in many cases may be adhered directly to a metallic member or be directly secured to a conductor or component, e.g., as by welding or soldering or the surface zone can be used directly as a conductor. In the latter instance, the surface zone resulting from reduction under comparatively mild conditions may, if desired, be adhered to a metal conductor, e.g., by plating said conductor from solution to join it to said zone to improve the metal adhering or conductive properties of the lightly reduced zone.

In accordance with another specific embodiment of this invention, a fusion joint or bond between yttrium iron garnet and a conductor is provided; in accordance with another, a fusion joint or bond between yttrium iron garnet and a semiconductor is provided.

In yet another specific embodiment, this invention provides a substrate consisting essentially of yttrium iron garnet and that has nickel plated on reduced surface zones of the yttrium iron garnet; and, in another, aluminum is joined to yttrium iron garnet, through chemical bonds which form at temperatures substantially above room temperature, e.g., at no less than about 100° C.

As an important aspect of the present invention, the conductivity of the relatively conductive zone or zones, characteristic of this invention, may be varied to a predetermined value or degree by varying reduction conditions under which the zone or zones are formed and which also provides a zone or zones with portions having varying coefficients of thermal expansion.

Another aspect of the present invention includes localized reduction of a dielectric body by a concentrated energy source, such as an electron beam, to selectively form comparatively metallic or conductive regions in accordance with a predetermined pattern. The depth of such regions may be varied, if desired, to provide multi-level conductive paths in a dielectric substrate.

For a more complete understanding of the present invention and for further objects and advantages thereof, reference may now be had to the following description taken in conjunction with the accompanying drawings in which:

FIG. 3 is taken in time sequence shortly after FIG. 2;

FIG. 4a illustrates, in section, a multiple plate capacitor made in accordance with this invention;

Figure 5:
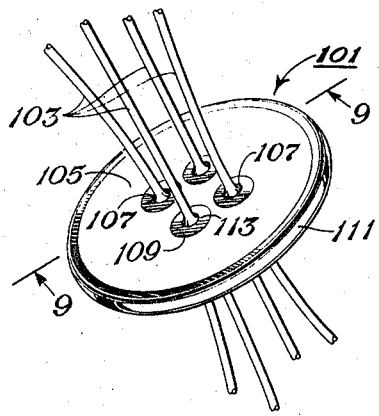
FIG. 5 is a perspective view of a sealing header for an electrical device in accordance with this invention showing feed through conductors.
Figure 9:
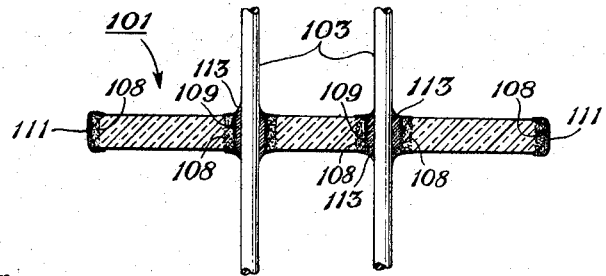
Figure 10:
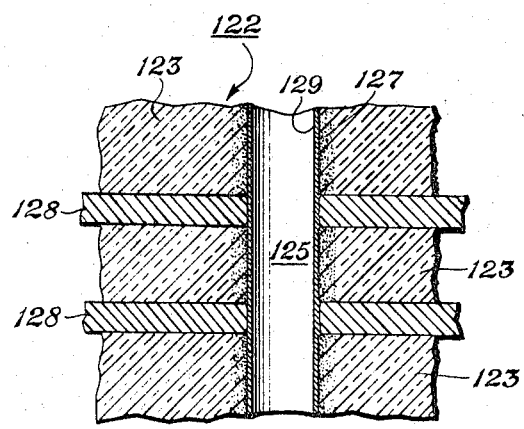

FIGS. 6, 7, 8, and 9 are sectional views illustrating, in sequence, the various stages of processing the header of FIG. 5; FIG. 9 being a section through the finished header along line 9—9 of FIG. 5 but to a larger scale than that of FIG. 5;

FIG. 10 is a partial section taken through a through-plated hole interconnector, wherein two conductive members, separated by a dielectric, are interconnected in accordance with the present invention;

FIG. 11 is a perspective view of a circuit board in accordance with the present invention;

FIG. 12 illustrates a use of the structure of FIG. 11, schematically showing the electrical interconnection of various semiconductor network packages on the structure of FIG. 11;

FIGS. 13, 14, and 15 sequentially illustrate the steps for making a circuit board of the nature of FIG. 11, or other dielectric substrate structure with selectively formed conductive paths thereon, in accordance with an embodiment of this invention;

FIG. 16 schematically illustrates a specific method, utilizing an electron beam, for "scribing" circuits on a substrate to form them by localized reduction.

Figure 17:
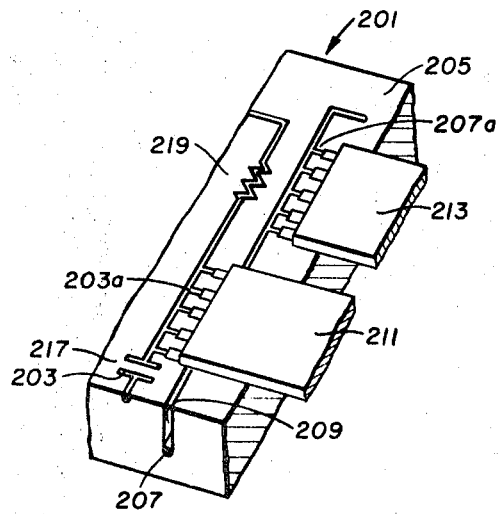
Figure 30:
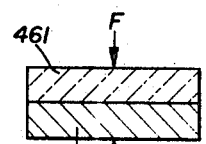
Figure 20:
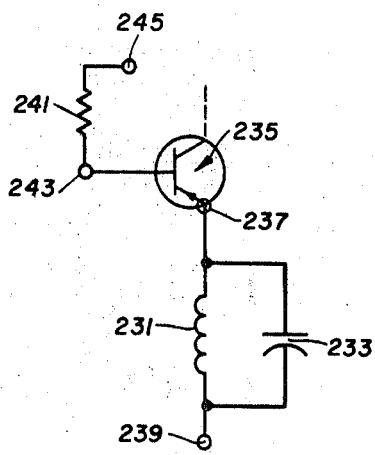
Figure 18:
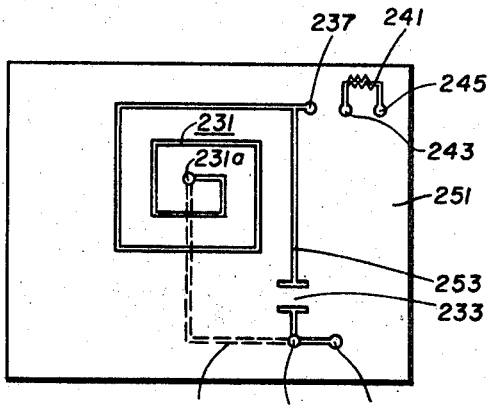
Figure 31:
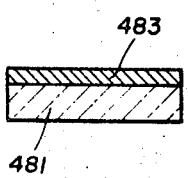
Figure 19:
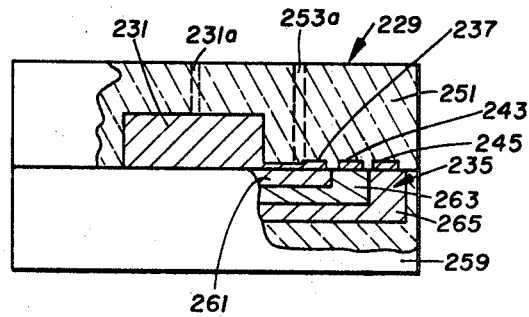
Figure 32:
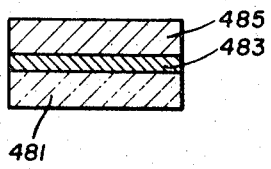
Figures 33, 34:
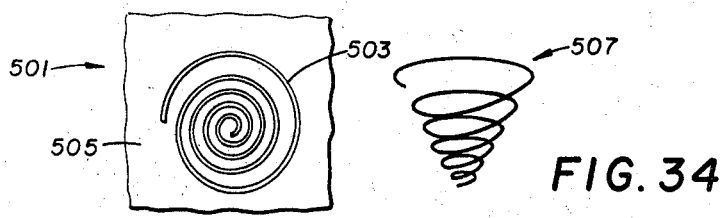
Figure 21:
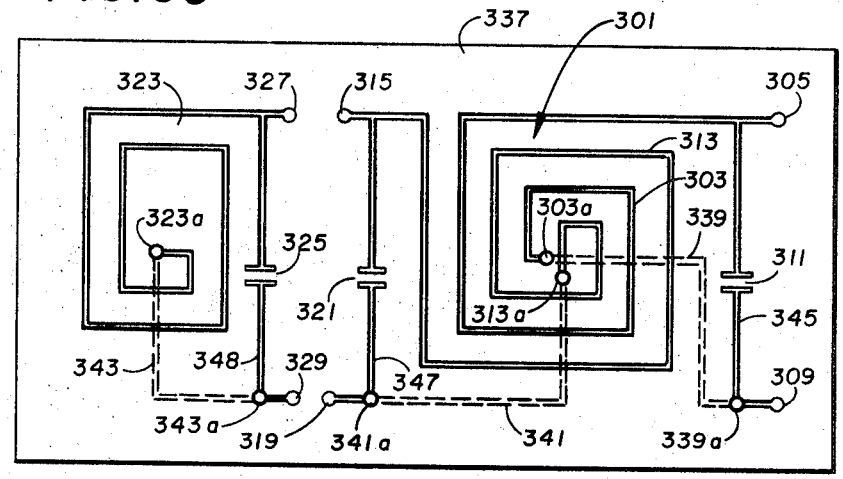
Figure 22:
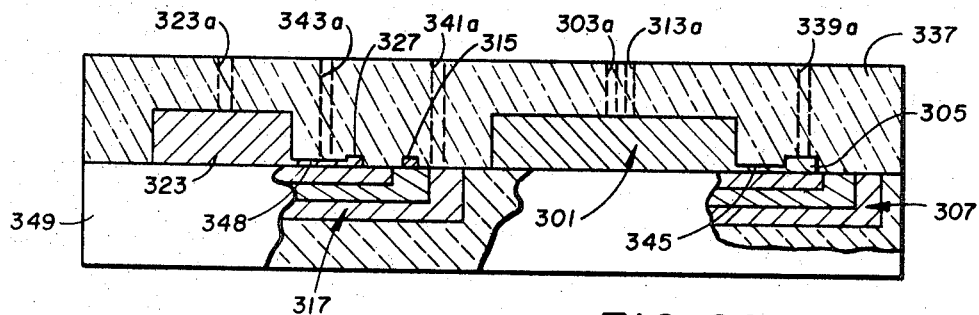
Figure 23:
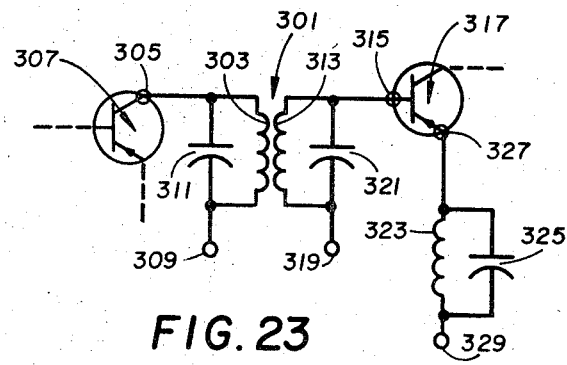
Figure 35:
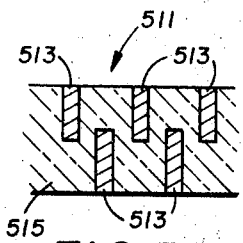
Figure 36:
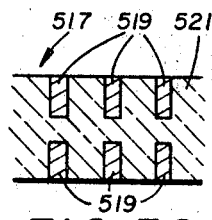
Figure 28:
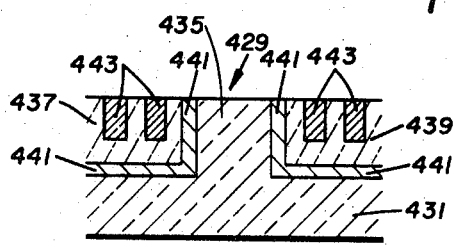
Figure 29:
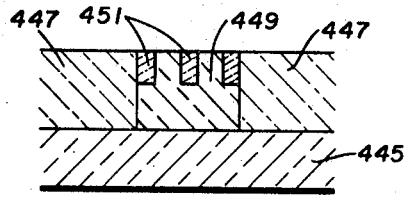

FIG. 17 is a pictorial view of a fragment of a circuit board carrying a pair of semiconductor network packages, and illustrating an embodiment of the multilevel circuit path aspect of the present invention;

FIG. 18 is a bottom view of a dielectric body having circuit paths formed thereon, including components, in accordance with the present invention;

FIG. 19 is an elevational view, partially in section, of a composite body, including the body illustrated in FIG. 18 joined to a chip, in accordance with an aspect of the present invention;

FIG. 20 is a circuit diagram illustrating pertinent circuitry carried by the composite body of FIG. 19;

FIG. 21 is a bottom view of a deducible dielectric body having circuitry formed thereon in accordance with the present invention, the circuitry including a transformer and various other components;

FIG. 22 is an elevational view, partially in section, of a composite body made up of the body of FIG. 21 and a silicon body carrying certain conventional circuitry;

FIG. 23 is a circuit diagram illustrating pertinent circuitry carried by the composite body of FIG. 22;

FIGS. 24–27 are sequential views, in elevational section, illustrating a method of joining a reducible dielectric material to a semiconductor body, including provision for conductive connection between the semiconductor body and conductive paths formed in the dielectric material;

FIG. 28 is a sectional, elevational view through a composite body of a reducible dielectric material and a semiconductor, illustrating how vapor phase deposition of the dielectric material may be used to form certain structures in accordance with the present invention;

FIG. 29 is a sectional, elevational view through a composite body of reducible dielectric material and semiconductor material, illustrating how sequential depositions of material may be accomplished to make a composite body in accordance with the present invention having various layers and regions of reducible dielectric material and semiconductor material;

FIG. 30 is an elevational sectional view, illustrating a method of joining a dielectric body and a semiconductor body in accordance with the present invention, by pressing them together through application of force;

FIG. 31 is a sectional, elevational view illustrating a dielectric body carrying a thin layer of aluminum, intimately bonded thereto in accordance with the present invention;

FIG. 32 is an elevational sectional view, illustrating the bonding of a semiconductor body onto the aluminum layer of the embodiment illustrated in FIG. 31;

FIG. 33 is a top, fragmentary view, illustrating an embodiment of an inductor in accordance with the present invention;

FIG. 34 is a schematic perspective view, illustrating the generally three-dimensional configuration of the inductor coil of FIG. 33;

FIG. 35 is a schematic fragmentary sectional view of a solid-state transformer in accordance with an embodiment of the present invention; and FIG. 36 is a schematic fragmentary sectional view of a solid-state transformer of a different configuration from that of FIG. 35.

An essential and characteristic feature of the present invention is the selective reduction of a portion or portions of a reducible crystalline body to form a zone or zones of reduction in said body. In general, the zones will be surface zones, e.g. they will extend from a surface of the body inwardly. These surfaces include those which define apertures in said body. The depths and particular characteristics of a zone of reduction will vary widely, depending on the degree of severity of reducing conditions under which it is formed. In some instances, a given zone will be found to be made up of several sub-zones which vary quite substantially in chemical composition as well as in resulting electrical characteristics such as resistivity (or its reciprocal, conductivity) and in coefficients of thermal expansion. For consistency of terminology, the words "zone" and "zones" will be used in conjunction with the word "reduction," or a variation of that latter word, to indicate the total reduced portion or depth. The words "sub-zone" and "sub-zones," will be used to refer to the distinct portions of a "zone" or "zones," at varying depths therein, having distinctive characteristics.

This invention applies generally to reducible dielectric oxide materials. A particularly useful example of suitable dielectric materials is those which are dielectric oxide compounds of at least two different metals wherein at least one of the metals is subject to a change in valence state by removal of oxygen from the compound. Specific examples of this particular group of dielectric materials is expressed below in Formulas 1–4 with reference to yttrium iron garnet.

(1) $Y_3Fe_5O_{12}$ (YIG)
(2) $M_xY_{3-x}Fe_5O_{12}$ where M is selected from the group consisting of aluminum, gallium, indium, thallium, lanthanum, scandium and the rare earth elements and $x$ can vary from 0 to 3.
(3) $Y_3A_qFe_{5-q}O_{12}$ where A is selected from the group consisting of aluminum, gallium, indium, thallium, lanthanum, scandium and the rare earth elements; and wherein $q$ can vary from 0 to 5.
(4) $M_xY_{3-x}A_qFe_{5-q}O_{12}$ where $x$ is always less than 3 when $q$ equals 5 and $q$ is always less than 5 when $x$ equals 3.

The invention will be described with reference to yttrium iron garnet (YIG) as an example.

Figure 1:
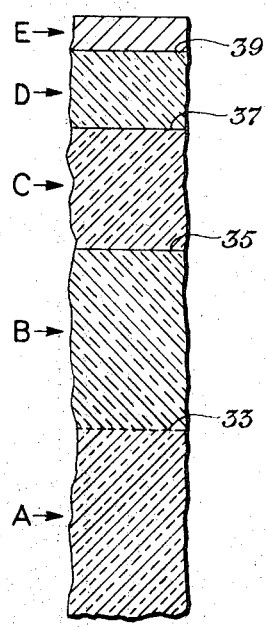
FIG. 1 is a fragmentary greatly enlarged section, schematic in nature, taken along 1—1 of FIG. 2.
Figure 2:
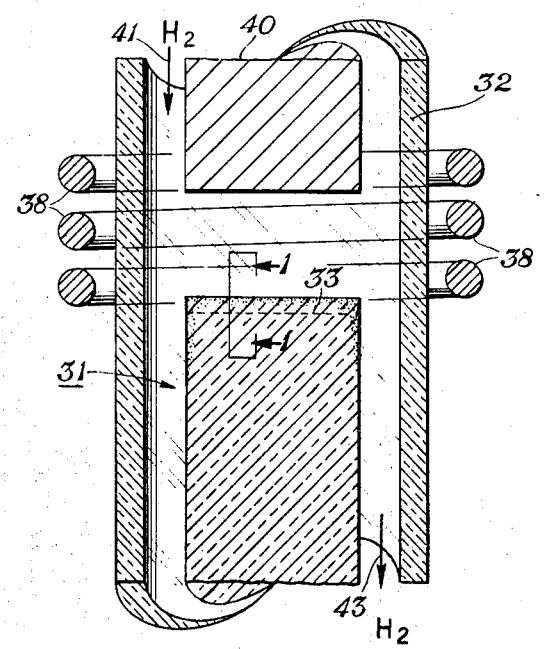
FIG. 2 is a sectional view of a dielectric body and a separate electrically conductive metallic member to which it is to be joined, shown in an exemplaryl partially illustrated process vessel. The view is taken at the completion of processing of the dielectric body and just prior to its being joined to the conductive member.

As an initial example, in accordance with this invention, a reducible crystalline YIG body such as that indicated generally by numeral 31 in FIG. 2, is subjected to exposure in a hydrogen atmosphere at a temperature of about 1000° C. for a period of about 30 minutes in an enclosure 32. This treatment generates a thin zone of reduction which extends from the upper end of body 31, as seen in FIG. 2, downwardly to a boundary of termination indicated along the dotted line 33 of FIG. 2. The nature of the zone of reduction is schematically illustrated in FIG. 1, a partially internal section of the upper end portion of the body 31 (as oriented in the position shown in FIG. 2). Referring now to FIG. 1, the main body portion, indicated at A, consists of the compound yttrium iron garnet, $Y_3Fe_5O_{12}$, hereinafter referred to as "YIG." YIG is highly dielectric, having a resistivity on the order of $10^{12}$ ohms.

The portion of the body section 31 shown in FIG. 1 above the dotted line 33, representing a transition boundary, is reduced YIG. This portion constitutes a zone of reduction on the YIG body 31 and such zone consists of the sub-zones or layers B, C, D and E, divided by the transition boundary lines 35, 37 and 39, respectively. Those layers are identifiable by a metallographic means and their composition approximately determinable by X-ray defraction means. The resistivity of the successively adjacent layers decreases rapidly from the resistivity of the main YIG body, layer D having a resistivity, for example, on the order of $10^{-4}$ ohms. The thin outer layer E is found to have a yet lower resistivity approaching or comparable to that of iron per se.

The various layers between the highly dielectric inner unreduced YIG body portion A and the outer conductive layer E are found to vary in composition, with a greater degree of reduction being present in the successively encountered layers, moving from the inner body A to the outermost essentially metallic layer E.

Layer B contains a major proportion of unreduced YIG, but in addition contains a large proportion of $YFeO_3$.

Layer C has a major proportion of $Y_2O_3$, a substantial proportion of $YFeO_3$, some elemental iron, and a relatively small proportion of unreduced YIG.

Layer D contains elemental iron in greatest proportion, a significant proportion of $Y_2O_3$, and lesser quantity of $YFeO_3$. It contains substantially no YIG.

Finally, layer E consists primarily of iron, but may include trace quantities of yttrium and, also minute quantities of $Y_2O_3$.

Considering the significance of the foregoing, by reducing a YIG body, a metallic or conductive portion, i.e., zone, can be formed on the outer portion of the body adjacent the exposed surface area of the body. The conductive, metallic zone is distinctly integral with, and in fact autogenously formed from, the dielectric YIG body. This metallic portion is a conductor, and moreover, advantageously provides a means for welding or otherwise joining metals to the YIG body. The various transition layers referred to between the main body and the outermost layer, i.e., layer E of FIG. 1, insure that mechanical stresses resulting from temperature changes will not become substantial since the several adjacent transition layers have compositions providing successively lower coefficients of thermal expansion. An integral and highly efficient expansion joint is thus effectively provided to permit connecting the YIG body to separate conductors.

If desired, a metallic member (e.g., part of a hermetically sealed structure or an electrically conductive member, etc.) may be firmly adhered to the outer metallic boundary (layer E, FIG. 1) by various welding or other metal juncture techniques. For example, referring to FIGS. 2 and 3, the fusion of a metal to a dielectric body is illustrated. An elongated body 31, for example rod-shaped, is maintained by suitable supports, not illustrated, within a quartz cylindrical enclosure tube 32. A radio frequency heating coil 38 is disposed about the quartz tube 32 and lies with its lower part generally adjacent to the upper end portion of the cylindrical body 31. An elongated iron body 40, for example cylindrical, is coaxially aligned with the body 31 and disposed a short distance above it as seen in FIG. 2. It is held in place by suitable supports, not illustrated, within which it may be axially moved, when desired, by pushing an upper extending end portion of it downwardly. The upper portions of the radio frequency coil 38 are disposed adjacent the lower end portion of iron body 40. The quartz tube 32 is enclosed in a conventional manner at either end (the upper closure providing slidable passage of an upper end of body 40) and is provided with a hydrogen inlet in an upper portion and a hydrogen outlet in a lower portion. Hydrogen gas is passed slowly through quartz tube 32 until all air is purged therefrom. Thereafter a hydrogen atmosphere can be maintained by very slow hydrogen flow. While tight seals are not necessary, a static hydrogen atmosphere may be maintained in the quartz tube if it is elected to provide such seals. The introduction of hydrogen is illustrated schematically in FIG. 2 at arrowhead 41, and provision for its withdrawal is illustrated schematically at arrowhead 43 in FIG. 2.

The processing of the YIG body, as well as preparation of the metallic body 40 to be joined thereto, is accomplished by maintaining the hydrogen atmosphere within cylindrical tube 32 while heating the lower portion of body 40 and the upper portion of body 31 by means of radio frequency coil 38. Radio frequency coil 38 is provided with conventional temperature control means, which in turn, is actuated by a conventional temperature-sensing device, such as a thermocouple or an optical pyrometer, to maintain temperature at desired level. The temperature is so maintained at approximately 1000° C. on the extreme upper surface of the upper YIG body 31 for a period of about thirty minutes. At this YIG body temperature, the temperature of the bottom portion of the iron body 40 is also at least about 1000° C. At the end of this period, the structure of the extremity of the extending end portions of YIG body 31 is reduced somewhat in surface zones during its exposure to heat under the hydrogen atmosphere reducing conditions. These reduced zones on the sides may be removed by sand blasting, by hard cutting tools, or by etching with hydrochloric acid. Alternatively, a thick sodium silicate solution may be coated about the sides of body 31 before processing. This forms a protective envelope of water glass which prevents reduction in the covered areas.

Figure 3:
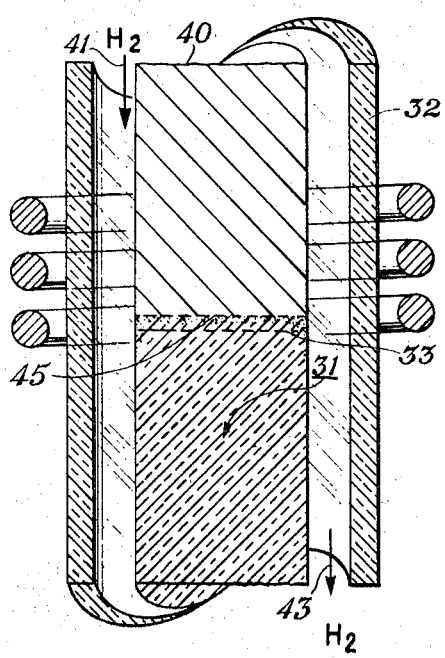
FIG. 3 is a sectional view of the subject matter of FIG. 2, but with the separate conductor moved downwardly into a joined position with the dielectric body.

After the processing period of thirty minutes has passed at 1000° C., power for the RF heat coil 38 is turned off and the metallic body 40 is moved downwardly into contact with the outer end surface of the YIG body 31. This position is indicated in FIG. 3. It will be apparent that contact of the body 31 and the body 40 occurs between the outer layer E, itself substantially metallic, e.g., iron, and the surface of metal (e.g., iron) body 40. The bodies 40 and 31 are allowed to remain in contact in the hydrogen atmosphere until cooling within the hydrogen atmosphere has completed. Fusion occurs that joins the bodies together with an extremely good bond. The bond between the body 40 and outer surface of the body 31 is metal to metal, e.g., iron to iron, the only transitions involved between the iron of the body 40 and YIG ceramic of the body 31 being provided by the transition layers E, D, C, and B (FIG. 1) which, in fact, are integral with and autogenously formed from the YIG body 31. The line of juncture between the YIG body 31 and iron body 40, an imaginary line indeed in view of the foregoing, is indicated at 45 in FIG. 3. The resulting product includes a very superior metal to ceramic bond or seal which is hermetic. Such a bond has important application, for example, as a hermetic seal for sealed electrical components such as, for example, high power rectifiers, miniaturized transistors, diodes, relays, switches, capacitors, etc.

It is emphasized that the bonding of metals to the metallic outer surface zone obtained by reduction of YIG is not limited to joining iron to YIG. For example, aluminum, copper, steel, gold, Inconel (trademark for an alloy containing approximately 79% nickel, 13% chromium, 6% iron, ¼ to 2% silicon, and sometimes small quantities of manganese, copper and carbon), Kovar (a compound consisting of 20% nickel, 17% cobalt, 0.2% manganese, and the balance iron), brass and other metals generally may be bonded to YIG onto appropriate reducible insulating ceramic materials such as previously described according to this invention. While it is not intended to be bound to any theory, it appears that when such metals are bonded or sealed onto the reduced outer zone of the YIG body, an alloying takes place in an intermediate layer between the metal being joined to the body and the reduced outer portion of the body. The exact nature of this alloying is not known but its depth may penetrate into the decreasingly reduced layers E, D, C, and B in varying degrees. In any event, it is found that a good bond, including a good thermal expansion joint, is provided between the adhered metal and the YIG body to which it is hermetically sealed.

Nor is the method and structure described above limited to joining a dielectric body, such as YIG, to metals only. It is also applicable to sealing or bonding a dielectric body to metals or other solid conductors in a broader sense. For example, graphite may be joined to the dielectric body (e.g. YIG) by reducing the dielectric body in a hydrogen atmosphere for a short period of time, ten minutes at 1400° C. being an example, and thereafter placing the graphite in contact with the reduced dielectric surface. The graphite is preferably heated simultaneously along with the dielectric body. The same technique as that previously illustrated in and discussed in connection with FIGS. 2 and 3 may be employed for effecting a graphite to dielectric bond to securely join the bodies together.

Examples of applications of graphite to YIG bonds include the support of graphite rods by YIG joined thereto and the insulation of ends of graphite rods by YIG.

Satisfactory graphite to YIG bonding is also found to occur when the graphite has been previously silicon carbide coated or boron nitride coated.

In those instances where the conductor to be adhered to the reduced YIG outer zone surface melts at temperatures substantially below the preferred reduction temperatures for the YIG body, the reduction of the YIG body may be accomplished in a prior step, and thereafter the conductor may be adhered to the outer zone of the YIG body by raising the conductor to a temperature somewhat below its melting point, along with the YIG, and then placing it into contact with the YIG surface to obtain a bond.

Alternately, suitable reduction zones may be formed on the YIG by processing at lower temperatures but for relatively longer periods. By this procedure, lower melting conductors to be joined to the YIG may be simultaneously heated with the YIG body in many cases.

The foregoing techniques may be modified in many instances by heating the YIG body and the conductor to which it is to be joined while they are in contact. For example, the iron body 39 of FIGS. 2 and 3 may be placed in instant contact with the YIG body 31 and thereafter the heating in a hydrogen atmosphere may be accomplished. The resulting bond is satisfactory although the technique of moving the bodies into contact after the reduction of the YIG has occurred is preferred in most instances.

The thickness of the zone of reduction on a reducible ceramic body may be varied with temperature and time. For example, a YIG body reduced in a hydrogen atmosphere in a furnace maintained at a temperature of 800° C. was observed to vary from a total thickness of from about 1–10 mils, when maintained at such temperature a relatively short period of time (ranging up to about fifteen minutes) to as much as about 250–300 mils in relatively extended periods. For example, penetration is found to be on the order of 250 mils in 1000–1100 minutes at 800° C. As another specific example, penetration is found to be about 25 mils in thirty minutes at 800° C.

Moreover, time may be maintained constant and varying thickness of the reduction zone is observed for different temperatures. A YIG body exposed in a furnace at 600° C. for thirty minutes showed a penetration or total zone thickness (e.g., the cumulative thickness of subzones B–E in FIG. 1) of about 2 mils. Exposure for this same period of time at 700° C. resulted in a total zone thickness of about 23 mils. At 800° C., total zone thickness was about 25–26 mils after thirty minutes. After 1000° C. for thirty minutes, total zone thickness was observed to be about 35 mils.

Not only is there variation in total zone thickness, but there is a change in the nature of the zone with varying conditions. For example, at up to about 700° C., it appears that usually only one distinct layer is present in a YIG reduction zone. This layer is one of partial reduction and generally corresponds to layer B of FIG. 1. As temperature is raised above 700° C. in processing, then a second reduction layer appears, comparable generally to layer C of FIG. 1. At somewhat more elevated temperatures, and as times are lengthened, the additional zones appear until the multiplicity of layers illustrated and observed in connection with FIG. 1 are all present.

There are instances when it is desired that the degrees of metallizing through the reduction technique be partial instead of complete. Thus, in some instances, it may be desired that a single and quite thin zone be present adjacent the surfaces of a reducible ceramic body. In such a case, the reduction is carried on under the comparatively mild conditions indicated above, i.e., lower temperatures and at shorter times, with particular emphasis on the lower temperatures.

Under extremely mild reducing conditions, such as exposure at 400°–500° C. in a hydrogen atmosphere for a period of from about ten to thirty minutes, a comparatively mild partial reduction can result in a very thin surface zone, for example, on the order of about 1 or 2 microns in thickness. Considering a YIG body, the mild partial reduction appears to take the form of a quite limited amount of reduction at only the tetrahedral iron position (as contrasted to the octohedral position) in the crystalline YIG structure. This mild partial reduction introduces what may be referred to as "oxygen defects" and a defect structure results which is relatively metallic and conductive, compared to the YIG body generally. For example, resistivity of the unreduced YIG body generally is on the order of about $10^{12}$ ohms while the resistivity of the partially reduced, "oxygen defect" surface zone is on the order of about $10^{10}$ ohms. This may be contrasted to the situation where a complete reduction of the surface regions of the YIG body occurs as a result of the more drastic reducing conditions described previously herein. Thus, an extremely mild reduction will result in a change of resistivity of as little as two orders of magnitude in the case of the quite mild reduction while a more drastic or complete reduction will result in a resistivity change of 10 or 15 orders of magnitude from the outermost zone to the inner, unreduced dielectric, e.g., YIG, body.

In any event, no matter what extent of reduction is employed, it will be appreciated that a surface zone or zones of the YIG body can be made comparatively metallic and conductive, while the internal zones of the YIG body, or other zones shielded from reducing conditions, remain substantially unimpaired. Thus, a dielectric body is provided that has comparatively conductive zones. Moreover, it is seen that the degree of conductivity may be varied in a predetermined manner by selecting reducing conditions of the appropriate degree of severity.

Figure 4:
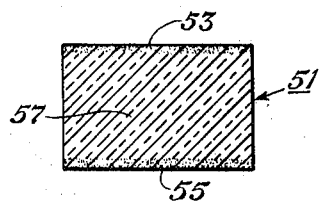
FIG. 4 illustrates, in section, an electrical capacitor made in accordance with this invention.

The making of comparatively conductive zones on a dielectric body has a wider range of aplication and a much broader significance than indicated by the dielectric to conductor bonding-sealing techniques previously described. For example, a capacitor or condenser may be made by the instant invention. Referring to FIG. 4, the body indicated generally at 51 may be utilized as a capacitor. It has a relatively conductive upper zone 53 and a spaced apart relatively conductive lower zone 55 supported by (indeed integral with) the dielectric interior portion 57. This body may be formed by reducing a wafer or block of reducible ceramic material in accordance with the techniques previously described herein. For example, a wafer of YIG may be exposed to a reducing environment, as exposure in a hydrogen atmosphere or exposure under vacuum conditions at a temperature of 1000° C. for thirty minutes. If the side regions of the wafer are shaved off to remove the reduction zones resulting therein, then it is readily seen that a condenser having the appearance of FIG. 4 is obtained. The dimensions, particularly the thicknesses attributed to reduction zone penetration, are exaggerated in FIG. 4 for purposes of illustration.

The characteristics of a capacitor made in accordance with the technique just described and having the general appearance of FIG. 4 may be varied widely by varying the reduction conditions, for example temperature and time.

The preferred technique for making a capacitor of the general type illustrated in FIG. 4 involves a mild reduction of the outer YIG body zones. In accordance with this technique, a YIG block or wafer of suitable shape is placed in an oven in which a hydrogen atmosphere is maintained or which is kept under vacuum. The YIG is heated at a temperature of about 450° C. for about twenty minutes. When removed from the oven and allowed to cool, it is found to have been partially reduced, as described previously herein, in thin surface zones. The resistivity of the thin zones 53 and 55 is found to be on the order of about $10^{10}$ ohms as compared to about $10^{12}$ ohms for the principal portion of the body, i.e., the unreduced YIG interior. The outer side portions of the block or wafer of YIG are removed by cutting tools or by sand blasting. Thereafter, the partially reduced YIG body, with its spaced upper and lower partially reduced zones, is immersed in a standard electroless nickel-plating solution and maintained therein at a temperature of about 95° C. for about thirty minutes. On removing the body from the solution, it is found that nickel has been preferentially plated on the partially reduced areas, i.e., on the defect structures in the spaced upper and lower zones 53 and 55 of the body. Thus, electroless nickel plating is simply, preferentially, and effectively accomplished on a YIG substrate. The resulting product is a dielectric body having spaced thin layers of metal adhered to its outer comparatively metallic zones. It should be noted that conductors, such as metallic wires, may be simply joined to the nickel plate by soldering or by various welding techniques.

The capacitance of a given capacitor is a function of the distance between the conductive portions or the thickness of the dielectric material separating the plates. The capacitance increases proportionately as the distance decreases. Advantageously this invention provides for simple and economic production of capacitors having widely differing capacitances. To vary the capacitance value, it is merely necessary to vary the thickness or depth of reduction of the dielectric body which can be easily done by controlling the described reducing conditions.

FIG. 4a illustrates an example of a multiple capacitor made in accordance with this invention. Therein, multiple capacitor 61 comprises a dielectric body 63 with autogenously formed, spaced apart comparatively conductive zones 65 and 67, which effectively provide plates for the capacitor. Zones 65 and 67 are located spaced from outer comparatively conductive zones 69 and 71, respectively, being separated therefrom by dielectric zones 73 and 75, respectively. The outermost conductive zones 69 and 71 effectively provide an additional pair of plates for the multiple capacitor 61. If desired, the upper and lower surfaces 77 and 79 (as seen in FIG. 4a) may contain metal plating, for example, nickel.

The multiple capacitor 61 may be formed, for example, from a block of YIG. The block of YIG is reduced (as in a furnace at 1000° C. in a hydrogen atmosphere) until the depth of the reduction zones formed penetrates to coincide with the innermost bounds of the conductive zones 65 and 67, respectively (FIG. 4a). Thereafter, the sides of the block of processed YIG are cut off so as to remove reduction zones running inwardly from the original surfaces of the sides. Next the resulting block is exposed to oxidation conditions, as in an oxygen atmosphere at 900° C., so that the outer portions of the reduction zones become oxidized to a dielectric material to a depth coincident with the outermost boundaries of conductive zones 65 and 67, respectively, as viewed in FIG. 4a. The sides of the block are cut off to remove oxidation layers extending inwardly therefrom, and thereafter, the resulting block is processed by again reducing it, as at a temperature of 500° C. in a hydrogen atmosphere. Reduction is stopped after the reduction zones formed reach a depth coincident with the outermost boundary of dielectric zones 73 and 75 (FIG. 4a). The resulting block may then be plated with metal, for example, with nickel by electroless plating. The sides are cut from the resulting block to remove the reduction zones extending inwardly therefrom. The resulting product is a capacitor like that illustrated in FIG. 4a and described in the preceding paragraph.

In some instances, it may be desired to remove (by cutting, sandblasting, ultrasonic machining, for example) certain portions of a multiple capacitor, such as that illustrated in FIG. 4a, so that electrical connections can be made to one, or more, of the internal conductive layers, e.g., layers 65 and/or 67 in FIG. 4a.

A multiple capacitor providing, in effect, two capacitors in series may be made by reducing a thin sheet of reducible dielectric material, for example, YIG, entirely through its body to change it to a material of comparatively low resistivity, for example, $10^{-1}$ ohms. Thereafter, the thin sheet is exposed to oxidizing conditions, for example, in an oxygen atmosphere at 900° C. Oxidation of the sheet in outer zones adjacent the opposite surfaces of the sheet is thus affected, with the central portion separating these two outer zones remaining substantially unaffected, i.e., with a resistivity of about $10^{-1}$ ohms for the inner zones. The oxidized zones are thus oxidized back into a dielectric material, e.g., YIG and other yttrium and iron oxides having resistivities of several orders of magnitude (for example, about ten orders) higher than the resistivity of the reduced inner portion, by such oxidation. Thereafter, the sheet is again exposed to reducing conditions, for example, mild ones, to form thin reduced outermost zones running a short distance inwardly from the outermost surfaces of the sheet into the oxidized zones. The sheet is plated with metal, for example, with nickel by electroless plating, and the sides of the sheet are cut off to remove the various zones extending inwardly therefrom. The resulting product is a multiple capacitor having, in effect, two capacitors in series. The outermost nickel plating on one surface of the sheet provides one plate and the central conductive portion a second, to define one capacitor; the outermost nickel plating on the opposite surface of the sheet provides one plate and the central conductive portion, a second, to define the second capacitor. It will be observed that the central conductive portion serves to place the capacitors in series.

A relay header is indicated generally at 101 in FIG. 5. From it extend four feed through conductors 103. These conductors pass through the dielectric disk body 105 of the header by means of apertures 107. The conductors 103 may be joined to the sides of the apertures 107 by solder, using conventional soldering technique. The apertures 107 are bounded by a thin outer annular jacket of nickel plating, indicated at 109 in FIGS. 5, 8 and 9. The nickel plating 109 also extends outwardly a short distance on the upper surface and lower surface of the disk 105 concentric about the apertures 107. Nickel plating 111 surrounds, and is firmly adhered to, the disk 105 to provide a conductive outer rim. The structure just described will be better appreciated when a method of its mnnufacture, in accordance with the present invention, is described.

Figure 6:
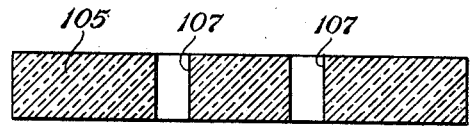
Figure 7:
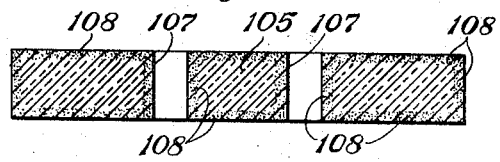
Figure 8:

Referring to FIG. 6, a dielectric disk 105, e.g., YIG, is drilled with four apertures 107 disposed generally to receive the wires 103 which ultimately are to pass through the finished relay header (FIG. 5). Thereafter, the disk 105 is placed in an oven which has a hydrogen atmosphere and is maintained therein at a temperature of about 500° C. for approximately thirty minutes. The YIG disk is permitted to cool and is removed from the oven. Body 105 is found to be partially reduced in zones 108 immediately adjacent its exposed surface, which includes the exposed bounding surfaces of apertures 107 and the outer rim of the disk.

Thereafter, the disk 105 is processed to shear off and remove the partial reduction zones on the upper and lower faces of the disk. The resulting body is then immersed in an electroless nickel plating solution at about 95° C. for thirty minutes. On removal of the body, nickel is found to have selectively plated on the partially reduced zones, which plating is indicated at 109 and 111 in FIGS. 8 and 9. Thereafter, it only remains to insert the conductors 103 into the metallized apertures 107 and solder them as at 113 (see FIGS. 5 and 9), to secure and seal them tightly in their passage through the header disk 105. The resulting article is the relay header indicated generally at 101 in FIGS. 5 and 9, previously described. Such a header may be greatly miniaturized in comparison to headers of the prior art. Prior art headers are conventionally based on metalglass assemblies and are necesarily unduly large for many applications since the metal thickness must be substantial to provide strength and the glass comparatively thick to provide insulation. Since ceramics have greater breakdown resistance with regard to voltage and temperature than does glass, thinner sections of ceramic can advantageously be utilized for this purpose. Ceramic having a greater strength than glass avantageously does not require discrete metal structural supports as does glass. These factors also contribute to miniaturization. The header 101, with its firmly adhered nickel plated layers and with its highly dielectric YIG body, provides strength, high integrity sealing, and insulation and yet permits miniaturization beyond that permitted by present comparable glass to metal sealing structures.

Further, the formation of integral metallized surfaces on the ceramic disk 105 avoids the necessity of applying bonding interlayers between the feed through conductors and a ceramic disk which might be used in accordance with piror art technique rather than in accordance with this invention. To use a ceramic disk for this purpose without the benefit of the present invention would cause problems such as exposing the disk to high processing temperatures required for causing intimate interaction between the interlayer introduced between the feed through conductor and the ceramic disk. At such elevated temperatures dimensional control of the interlayer which is at least in the plastic state is difficult and the ceramic is exposed to the dangers of thermal shock. In contrast, the present invention permits using low temperatures for reduction (as above described) and also the use of a low melting point solder. The metal plating, the metallized portion of the ceramic and the solder surrounding the lead are believed to act as a buffer or a thermal expansion joint which permits selection of a wide variety of materials for the leads and ceramic disk without requiring close matching of coefficients of thermal expansion as heretofore required in metal to glass arrangements.

FIG. 10 is a partial view in cross section through a multilevel board generally indicated at numeral 122. The illustrated portion 122 serves as a through-plated hole interconnector which connects spaced conductors or conductive layers 128 on different levels. The conductive layers 128 are separated by dielectric sheets or layers 123, e.g., formed of YIG. Layers 123 are firmly adhered to layers 128. The surfaces of the dielectric layers defining hole 125 are reduced to provide the relatively reduced, and hence, relatively metallic, YIG zone 127. A nickel plating 129 is firmly adhered to zone 127 as well as to the ends of the spaced conductive layers 128. Spaced conductive layers 128, it will be observed in FIG. 10, are penetrated by through-drilled hole 125.

The advantages of the structure of FIG. 10 will be more readily understood on considering its method of manufacture. The body portion 122, carrying the spaced conductive layers 128 at different levels, are drilled through perpendicular to said conductive layers so that the hole 125 passes through the conductors. The body 122 is then placed in a furnace in a hydrogen atmosphere and maintained therein at a temperature of approximately 500° C. for fifteen minutes. The body 122 is allowed to cool and is removed from the oven. At this time, the relatively reduced zone 127 which extends annularly inwardly from the surface boundaries of the hole 125 will have formed. The body 122 is next disposed so that the hole 125 is immersed in an electroless nickel plating solution. Electroless plating is then conducted to apply the nickel plate 129. The resulting nickel plate is adhered firmly to the reduced areas and to the clearances between the YIG and conductive layers 128 adjacent where their lateral portions intersect the hole 125. Thus, a very fine connection is made with good plating support firmly adhering to the spaced conductors (i.e., the conductive layers) and making bonded contact with the plated hole. It will be noted that a three-planar support is effectively provided for the conductors.

FIG. 11 illustrates a circuit board, of the so-called "printed circuit" type, which is made in accordance with another aspect of the present invention. The circuit board, indicated generally at the numeral 131, includes the dielectric substrate 133 and the conductive paths 135 on the upper face of substrate 133. These paths may take a multiplicity of patterns, that of FIG. 11 being merely illustrative. The paths 135 are preferably nickel plated on reduced surface zones in accordance with the present invention, but under some conditions the plating 135 may be omitted and the comparatively conductive surface zones themselves used as the conducting paths.

While many uses of circuit board of the general nature of 131 are believed evident, the simplified drawing of FIG. 12 illustrates a specific use of the board 131. Therein semiconductor network packages 137 are shown affixed interconnected in desired circuit position on the board, the leads from the packages being welded or soldered to the selectively formed conductive paths.

The selective conductive paths 135 of FIG. 11 are made by reducing a suitable dielectric body, e.g., YIG, in surface zones, as previously described, and then cutting away or otherwise removing those conductive zones in regions where insulation is desired in order to leave only the selective paths of reduction in the desired circuit pattern. The conductive paths 135 may be also made by another approach, within the scope of the present invention, which includes the selective, localized reduction of surface zones of a YIG body or a dielectric substrate. Manufacture of an item of the general nature of FIG. 11 in accordance with both concepts will be discussed herebelow.

Referring to FIG. 13, there is shown a cross-sectional view of a sheet of a reducible dielectric, for example, YIG, which is scribed with a sharp tool or die to form V-shaped depressions 141 on the upper surface thereof. The scribing is conducted to produce the desired selected circuit pattern. After the scribing is complete, the dielectic substrate is then placed in an oven and heated in a hydrogen atmosphere, or under other reducing conditions as in a vacuum or in a moist helium or argon atmosphere, e.g., for a period of about thirty minutes at a temperature of about 400° C. Partial reduction of the surface zones adjacent all exposed surface areas occurs. The resulting YIG substrate with external partially reduced, conductive metallic surface zones is cooled and removed from the oven. Its appearance is schematically illustrated in FIG. 14 wherein the YIG body 139 is shown to have partially reduced zones 143 extending inwardly a short distance from its exposed surfaces. By a sharp cutting tool, sand blasting or other suitable means, the sides, bottom and top are next removed from body 139 to leave only those zones in the scribed depressions 143. Thereafter, the body is plated in electroless nickel plating solution by electroless plating technique, for example at about thirty minutes, at a temperature of approximately 95° C. The resulting plates product is schematically illustrated in FIG. 15, wherein the external surfaces of the reduced surface zones bounding the scribed depressions 143 are shown to have nickel plating 145 adhered thereto. The foregoing technique produces a board of the nature of that illustrated at 131 in FIG. 11, including plated conductive paths thereon.

A circuit, and indeed a multiplicity of electrical circuit components, may likewise be made or formed in a suitable dielectric substrate, e.g., YIG, by selective, localized reduction. Simultaneous scribing and localized, selective reduction of a reducible dielectric body in accordance with this phase of the invention to produce the desired pattern of circuit paths, components, etc. may be carried out by employing a concentrated energy source imposed against selective portions of the substrate. For example, referring to FIG. 16, YIG body 151 may have conductive circuit portions formed thereon with an electron beam, indicated schematically at arrowhead 153, as an example of a concentrated energy source. Beam 153 directs energy on the surface of the YIG body through narrow slots in a mask 155 to bombard the substrate therebelow at predetermined places localized on the substrate to form the reduced zones 157 in accordance with any desired circuit pattern. The forming of the conductive zones with the beam is conducted in an environment which permits reduction, for example, in a vacuum where the pressure is, for example, $10^{-5}$ mm. Hg absolute. By this approach, any desired pattern can be directly produced on the substrate. The substrate is reduced only in those immediate areas where the beam contacts it, and thus paths of local reduction in accordance with a desired circuit pattern may be formed in a one-step operation on the substrate. Subsequent removal of unwanted reduced areas is made unnecessary.

A preferred technique omits a mask, utilizing an electron beam spaced from the substrate by a short distance such that optimum beam resolution is obtained. Highly localized reduction is accomplished where the beam strikes the substrate and it is merely necessary to move the beam about over the face of the substrate in any desired pattern in order to accomplish localized reduction for a complete circuit "drawing."

In some instances, it will not be desired to plate the electron beam bombarded reduced circuit pattern, the comparatively conductive surface pattern of the localized reduced zones being sufficient to serve as conductive paths for the application involved. In many applications, however, it will be desired to plate the localized, reduced paths or portions thereof, as with nickel or other metal in order to produce a highly efficient conductor path on the dielectric substrate.

Other means of reduction, both general and localized, may be resorted to. Thus, reduction may be accomplished (1) by the interaction between YIG and graphite in a reducing atmosphere at about 800° C.; (2) by the interaction in air of the dielectric body with deposited aluminum on the surface thereof at temperatures of about 600° C. (as low as about 100° C. for quite limited reduction and for bonding aluminum to YIG through chemical bonds); (3) by concentrated energy sources such as electron beam, arc, laser, spark; or by a variety of means that will reduce the reducible ceramic body to provide conductive zones thereon. Localized reduction, in accordance with a desired pattern, may also be accomplished by small nozzles that impinge heated hydrogen in thin concentrated streams on a reducible substrate, as well as by vapor phase deposition of aluminum, utilizing masking procedure, followed by reduction in air at temperatures of about 500° C. to 600° C.

In the case of YIG, this will take the form of any means of reducing at least a part of the iron therein from a valence state of 3 to the lower valence state of 2. For many applications it is necessary or even desirable that only a minor amount of such reduction occur.

The plating of this invention is not limited to nickel, a wide variety of conventional plating techniques being available to deposit various desired metals on the reduced YIG zones.

It is pointed out that the degree of reduction of a dielectric body, in accordance with this invention, may be varied over wide limits. This is very advantageous in some instances. For example, a pattern of comparatively conductive portions may be formed having varying and predetermined degrees of conductivity at different locations on a dielectric material. A circuit may thus be formed on a dielectric substrate that has desired, varying characteristics. By way of illustration, a conductive path may be formed that has a portion that is not nearly so conductive as adjoining portions of the path. The portion of higher resistivity thus serves as a resistor. Also capacitors can be formed directly in the substrate using the dielectric portion of the substrate for the capacitor dielectric. For example, a surface may be bombarded by an electron beam at each of two spaced apart locations on a YIG substrate. The YIG separating the resulting, spaced apart, comparatively conductive portions formed by the electron beam serves as the dielectric for a capacitor for which the spaced apart conductive portions serve as plates. It is seen that a circuit having a variety of predetermined characteristics may be made in such manner.

For a number of applications it is desirable that conductive paths be located at different levels in a circuit board. This makes it possible to increase the number of components and/or semiconductor networks carried by the board. On conventional circuit boards some care must be taken in mounting components and semiconductor network packages to prevent contacts or leads from shorting against portions of the conductive paths on the circuit board which they are not supposed to contact. The problem of the highly populated surface is solved by the present invention by providing multilevel paths and/or by providing various components formed within the dielectric substrate itself. This application of the present invention may be appreciated by referring to FIG. 17, which illustrates, in section, pictorial view of a portion of a circuit board 201. The circuit board 201 has a shallow conductive path 203 which extends inward a short distance from the upper face of the reducible dielectric substrate 205 which may be made, for example, of YIG. In addition, a comparatively deep path 207 runs parallel to path 203 and is spaced but a short distance from it. The conductive path 207 runs along the bottom of the elongated trench 209. The semiconductor network packages 211 and 213 are supported by the upper surface of the substrate 205. Transversely extending portions 203a and 207a of conductive paths 203 and 207, respectively, are conductively joined to the leads from the respective semiconductor network packages 211 and 213, for example, by welding or soldering.

A better appreciation of the structure of FIG. 17 will be had after considering the method of forming the paths 203 and 207. The path 203 is formed by localized reduction, for example, by an electron beam, in the same manner that the path 135 was formed upon substrate 133 of FIG. 11. A similar technique is employed for the formation of the path 207; however, sufficient localized energy is applied to vaporize the substrate material down to a desired depth of trench 209 during the formation of the path. Some reduction of the YIG substrate occurs along the sides of the trench 209 during its formation; however, the greatest extent of reduction by far occurs just below the beam. The result is that the bottom portion of trench 209 is much more reduced and conductive than the side portions bounding the trench. In some instances, the degree of reduction which occurs on the sides of the trench during formation is insufficient to render that portion sufficiently conductive to offer substantial danger for shorting. In other instances, it will be desired to abrade the sides of the trench 209 to remove some material to make the sides of the trench 209 of a greater resistivity. In most cases, it is desirable to preferentially electroless plate the conductive path 207 with nickel, or other metal, to substantially increase its conductivity. During the plating operation, the comparatively non-conductive side of the trench 209 may be masked (e.g. with epoxy) to make sure that no plating occurs thereon.

The portions 207a of path 207 may be formed by moving the concentrated source of localized energy perpendicularly outward from the trench until the desired length of each path portion 207a is obtained. It will be appreciated that toward the end extremity of each path portion 207a, the exposure of the substrate to the concentrated energy source may be lessened in order to raise the reduction zone formed flush with the level of the main portion of the upper face of substrate 205. Accordingly, an appropriate lead from package 213 may be directly placed upon and soldered or welded to the surface reduced zone (or to the plating on the surface reduced zone, if plating has been applied) on the end portion of a path 207a. The end contacts for deep paths, for example, the end contact 215 of path 207 in FIG. 17, may be formed in similar fashion.

From the foregoing, it will be seen that the semi-conductor network package 211 can lie across the trench 209 without making contact with the conductive path 207 in the bottom of trench 209. Insulation is effectively provided by the depth of trench 209. Accordingly, the semiconductor network 211, and its leads, are not in danger of shorting with the conductive path 207.

FIG. 17 also illustrates passive components carried in the dielectric substrate 205. For example, the capacitor 217 in path 203 and a resistor 219 in path 207 are formed in situ in substrate 205. Formation of the capacitor 217 is accomplished merely by moving the electron beam, or other concentrated energy source, perpendicular to the main travel of the path 203 to reduce zones for capacitor plates. A small skip in the "scribing" with the beam leaves a portion of unreduced substrate between the plates to serve as a dielectric for the capacitor. The resistor 219 (schematically represented in FIG. 17 by the darkened portion at 219) in path 203 may be formed by decreasing the degree of exposure of the substrate to the concentrated energy source in the area of the resistor, thereby decreasing the degree of reduction of substrate in this region of the conductive path and/or by masking (e.g. with epoxy) this portion of the path during a metal plating operation, so that this portion of the conductive path 203 remains unplated. Similar techniques may be used for component formation in the comparatively deep conductor path 207.

The variation of degree of conductivity for a circuit pattern at predetermined locations may be accomplished by varying the degree of exposure of the substrate, at such locations, to the conditions of reduction being imposed. For example, the intensity of an electron beam scribing the substrate may be increased at locations where a greater degree of reduction (and, hence, conductivity) is required, or alternatively, the exposure time to the beam may be increased to give a greater degree of reduction.

In those instances where plating is utilized in the present invention, the plate is in intimate contact with the reduced zone to which it adheres. For example, nickel plated by electroless plating technique to a mildly reduced surface zone of YIG (the defect type structure zone) has a much stronger adherence or bond then when nickel is plated on a conductor by the same electroless plating technique. It is thought that the intimate contact obtained in the former case may be the result of a structural positioning of the nickel in the oxygen defects in the mildly reduced zone, but for whatever the reason, the bond is far stronger than the usual bond obtained from electroless plating on conductors.

While electroless plating solutions and techniques are well-known, the following solution and technique is given as an example: The initial solution contains 3 percent $NiCl_2.6H_2O$, 1 percent of $NaH_2PO_2.H_2O$, 5 percent ammonium chloride, 10 percent sodium citrate, and 81 percent water (all percentages being by weight). To 100 volumes of the foregoing solution, 5 volumes of ammonium hydroxide are added and the solution is heated to 95° C., at which time 5 more volumes of ammonium hydroxide are added. The item to be plated is immersed in the solution, which is maintained at 95° C. for ½ hour. Every six minutes, two volumes of ammonium hydroxide are added during this thirty minutes to replace loss. At the end of this thirty minute period, the item is removed and washed with water and alcohol and then air dried.

The specific electron beam source utilized in the practice of an embodiment of this invention is not critical. As an example, the following assembly, operated at the settings indicated, operated satisfactorily:

Machine—Carl Zeiss BFM100W, "Electron Milling Machine"
Vacuum—$1.8 \times 10^{-5}$ mm. Hg
Pulse height—1
Pulse frequency—2
Pulse width—7
Voltage—100 kv.
Current—30 microamps
Filament current setting—72

A reduction zone of about .075 millimeter deep, of narrow width, was obtained on a YIG substrate with a focused beam from the above apparatus.

It is seen, in accordance with the foregoing, that dielectric bodies with conductive portions and a method of making such bodies has been provided. A quite important aspect of the invention relates to the reduction of a dielectric body to form comparatively metallic, conductive portions from the body. Such portions are integral with the body and may be adhered to conductors in various ways, including fusion to a conductor and plating a conductor thereto. In some instances the comparatively conductive portions are formed in patterns, as for circuit boards.

Another aspect of the present invention involves the integration of a reducible dielectric body with a semiconductor body (often referred to as a "chip") to form a composite structure. Such a composite structure is hereinafter referred to as a "composite body," and a circuit built in such composite body is referred to as a "solid-state composite integrated circuit."

FIG. 19 shows, in partial section, a composite body 229, which embodies various features of the composite body and solid-state composite integrated circuit of the present invention. The composite body 229 includes a dielectric body, which is illustrated in FIG. 18, as viewed from the bottom. FIG. 20 is a circuit diagram of the circuit provided within the composite body 229. Referring to FIG. 20, it will be seen that a tuning or tank circuit of conventional design is illustrated therein. The circuit includes the inductor 231 in parallel with capacitor 233. These parallel components are connected by a conductive path with the emitter of the transistor 235, the connection being through the contact 237. The other side of the circuit from the parallel inductor 231 and the capacitor 233 leads to a contact 239. A resistor 241 is connected to the base of transistor 235 through contact 243. The other side of the resistor 241 is electrically connected to the contact 245.

Referring to FIGS. 18 and 19, it will be observed that the inductor 231 lies within the dielectric body 251. The dielectric body 251 is of a reducible dielectric material, for example, YIG. The capacitor 233 and the resistor 241 are disposed in the lower surface of the body 251. The circuitry for inter-connection between the components, in accordance with the circuit diagram of FIG. 18, is provided within the body 251. This circuitry includes the conductive path 253 and the contacts 237, 239, 243, and 245, all formed in lower surface regions of the reducible dielectric body 251; the conductive paths 231a and 253a, which pass through the dielectric body 251; and the conductive path 255, formed in upper surface regions of reducible dielectric body 251.

A semiconductor body or chip 259, for example, made of monocrystalline silicon, gallium arsenide, or germanium, underlies the dielectric body 251 and is joined to it with the upper surface of the semiconductor chip in contact with the lower surface of the dielectric body (see FIG. 19). The semiconductor chip carries various components and circuity in it, in accordance with prior art technology, including the PNP transistor 235. Transistor 235 is of the planar diffused type, having a P-type emitter region 261, an N-type base region 263, and a P-type collector region 265. The contacts 237, 243, and 245 are respectively fused to emitter 261, base 263, and collector 265 of the transistor 235 to provide good ohmic contact with these respective transistor regions. Note that a thin film of silicon dioxide (not illustrated) protects the upper surface of the semiconductor chip 259 in all regions except where the contacts engage in exposed contact regions in the semiconductor chip.

In the making of the composite body 229, including the formation of the solid-state composite integrated circuit it carries, the various conductive paths and contacts, the capacitor 233, and the resistor 241 are all formed by localized reduction of the reducible dielectric body 251 by a concentrated energy source, for example, by an electron beam, as previously explained herein.

Attention is directed to the inductor 231. This inductor is formed by "scribing" the bottom face of the reducible dielectric body 251 with a localized, concentrated energy source, such as an electron beam to reduce regions of the body in a pattern forming an inductor. The geometry of the pattern of inductor 231 is such that a plurality of concentric windings are produced. The configuration of these windings is of a generally rectangular nature, being defined by a path that, never crossing itself, proceeds inwardly through a series of rectangular turns, terminating in a connecting conductive path 231a, which extends from the center of the inductor 231 upwardly through the body 251 to its upper surface. The connecting conductive path 231 may be formed by drilling in body 251 with an electron beam under conditions at least partially reducing the side areas adjacent the hole bored by the beam's path. The depth of the convolution of inductor 231 formed in body 251 may be varied as desired. In FIG. 19, this depth is shown to be a substantial portion of the dimension through the thickness of the body in order to facilitate illustration. It is advantageous that the coils of the inductor be cut at least somewhat into the body, i.e. that at least a shallow trench be formed by the electron beam during formation in order that the material of the body rather than air may serve as the core of the inductor. In the event that it is desired to make a transformer by forming coils of the general type of the inductor 231 to extend opposite inwardly from opposite sides of a reducible dielectric body, quite deeply cut coils are sometimes desired in order that the oppositely disposed convolutions of the coils may be disposed partially wound one within the other to define adjacent coil regions.

The coils of inductors formed in a reducible dielectric body need not be rectangular, for example, they may be circular, or of a multitude of other desired configurations; they may be shallow instead of deep as illustrated, or they may be of variable depth.

A hole is drilled through the body 251 to connect the portion of the path 253 in the lower surface of the body 251 with a portion of the path 253 on the upper surface of the body 251. This operation is preferably conducted by an electron beam, or similar concentrated energy source, in an analogous manner to the formation of the hole defining conductive path 231a, sides bounding the hole being partially reduced by the drilling operation. The resulting connecting conductive path 253a effectively interconnects the conductive paths in the opposite faces of body 251.

Contacts 237, 243, 245, and 239 are formed in the lower face of the body 251 by reduction with a concentrated energy source, e.g. and electron beam. These contacts are relatively large, compared to the width of the conductive paths, to increase the certainty that they will form a satisfactory electrical contact with the appropriate underlying regions of the semiconductor chip 259.

After the various circuit components, paths, and contacts are formed in body 251 by localized reduction, the body is preferably immersed in a plating solution and a metal plating preferentially formed over all the reduced regions, with the exception of resistor regions, which may be protected by masking (e.g., with epoxy) during the plating operation. Plating may be nickel, silver, etc., deposited by electroless plating technique. The conductivity of the circuit members is substantially increased by such plating.

The semiconductor body or chip 259 is processed in accordance with techniques known in the art to form the planar diffused type transistor 235 and such associated circuitry and contacts as are required. Contacts may be formed, for example, by evaporation of metal into or onto suitable recesses or regions on the semiconductor body.

The assembly of the reducible dielectric body 251 and the semiconductor body 259 first involves registering the contacts on the reducible dielectric body 251 and the regions on semiconductor body 259 which the contacts are to engage. Thereafter, the contacts are fused to the underlying contact regions of the semiconductor body against which they are pressed. The fusion step can be conducted, for example, by heating the dielectric and semiconductor bodies while they are pressed together in proper registry. Note that the fusion is between the metallic (or at least metallized) contacts on the reducible dielectric body and metallic contacts carried by semiconductor regions or (as the case may be) the semiconductor body. A good bond may generally be formed between the metallic or metallized contacts and semiconductor regions since eutectics are formed between various semiconductors and certain metals at relatively low temperatures. For example, if the contacts on the reducible dielectric body are of aluminum, heating to in excess of about 500° C., while an aluminum contact and a silicon region are pressed together causes a eutectic to form between the abutting regions of the silicon and aluminum, thus insuring a quite good bond of more than a mechanical nature. Aluminum contacts may be formed on the dielectric body 251 in a relatively simple manner, for example, by first plating the reduced contact regions with nickel, followed by deposition of aluminum over the nickel, e.g. by evaporation technique.

The fusion step described above accomplishes two important purposes: it tightly bonds the reducible dielectric body and semiconductor body together, and it makes essentially ohmic contact at the point where the contacts of the dielectric body meet the contact regions on the semiconductor body.

The composite body 229 is equipped with such external leads (not illustrated) as are required. The external leads can either be to contacts provided on the YIG body 251 or to contacts formed in the semiconductor body 259, depending on convenience and the exact detail of associated (cooperative with the tuning circuit described) contained in the semiconductor chip 259.

In some instances, it may be desired to adjust circuit values after a composite body of the nature illustrated in FIG. 19 is assembled. This can be accomplished by leaving broken portions in the conductive paths which are formed in exposed surface regions of the reducible dielectric body. For example, a skip may be made in scribing the conductive path 233 along the top of the body 251. After checking the circuit characteristics of the assembled body, a resistor or capacitor of desired value may be formed to bridge the break in the path and adjust the circuit as required. In this connection, note that the resistor 241 in the body 251 of FIGS. 18 and 19 could be formed on the upper surface of body 251 after the assembly of the composite body 229. This would entail forming conductive paths from contacts 243 and 245 passing through body 251 to its upper surface. Then, after assembly of composite body 229, the resistor 241 could be formed in situ by localized reduction accomplished to a desired degree to give the resistor the required value.

FIG. 22 illustrates, in partial section, a composite body of a reducible dielectric body and a semiconductor body which carries a transformer coupled tuning circuit. FIG. 21 is a bottom view of the reducible dielectric body involved in such composite. The circuit carried in the composite body is presented in the circuit diagram of FIG. 23. Therein a transformer 301 has its winding 303 connected with one side through the contact 305, which provides ohmic contact with the collector of transistor 307. The other side of the winding 303 leads to contact 309. The capacitor 311 is in parallel with winding 303. Winding 313 of transformer 301 has one side connected to the contact 315, which provides ohmic contact with the base of transistor 317. The other side of winding 313 electrically connects with the contact 319. The capacitor 321 is provided in electrical parallel with the winding 313. The tuning circuitry provided by the parallel inductor 323 and capacitor 325 is electrically connected to the contact 327, which provides good ohmic contact with the emitter of transistor 317. The other side of the tuning circuit provided by parallel inductor 323 and capacitor 325 leads to a contact 329. The circuitry associated with the base and emitter of transistor 317, with the collector of transistor 317, and to which the contacts 209, 319, and 329 are connected, are all provided within the semiconductor portion of the composite body of FIGS. 21 and 22, and are of a somewhat variable nature, depending upon the total function of the circuitry within the body. Accordingly, such associated circuitry will not be illustrated.

Referring now to FIGS. 21 and 22, it will be observed that the transformer 301 is provided within the reducible dielectric body 337. The windings 303 and 313 are of a rectangular convolutional configuration, never crossing, and oppositely wound with the coils of one lying within the coils of the other. The coils of both windings 303 and 313 extend from the lower face of the reducible dielectric body 337 upwardly, well into its internal regions. The central portions of each of windings 303 and 313 follow a conductive path (paths 303a and 313a, respectively) upwardly through the dielectric body 337 to connect with conductive paths 339 and 341, respectively, formed in the upper face of the dielectric body 337. The capacitors 311, 321, and 325 are all formed in the lower surface regions of the dielectric body 337. The inductor 323, of rectangular, convolutional configuration, is likewise formed in the lower surface regions of the dielectric body 337. Its centralmost winding is conductively connected by a conductive path 323a, which passes through the thickness of the body 337, to a circuit path 343 in the upper surface regions of the body 337. The conductive paths 339, 341, and 343, respectively, connect to the conductive paths 345, 347, and 348 in the lower surface regions of the body 337 by means of connecting paths 339a, 341a, and 343a, respectively, which run through the thickness of the body 337. It will be appreciated that the paths 303a, 313a, 323a, 339a, 341a, and 343a are provided along the bounding surfaces of small holes drilled through the reducible dielectric body with a concentrated energy source, for example, an electron beam. Accordingly, the bounding surfaces are partially reduced, to become comparatively conductive.

Attention is directed to the various contacts in the lower surface regions of the reducible dielectric body 337, i.e. 305, 309, 315, 319, 327, and 329. The contacts are accurately located with respect to the lower surface regions of the body in order that they will register with appropriate matching contacts or regions in the upper surface regions of the semiconductor body 349. The semiconductor body 349 is protected by a thin film of silicon dioxide (not illustrated) over all its surfaces except for the contact regions of the body.

In view of the description previously made herein concerning the circuitry and component structure of the composite body of FIG. 19, including the method of formation of such structure and the assembly of the reducible dielectric body and semiconductor body, no further comments are believed necessary concerning the composite body of FIG. 22, since a direct analogy exists.

In some instances, it is desirable to form a composite body of dielectric material and semiconductor material prior to formation of some or all of the components and associated circuitry in the composite body. One method of accomplishing this is to deposit material, as from the vapor phase, of one material upon a substrate consisting of the other material, for example, to deposit YIG upon a substrate of a semiconductor material.

Figure 24:
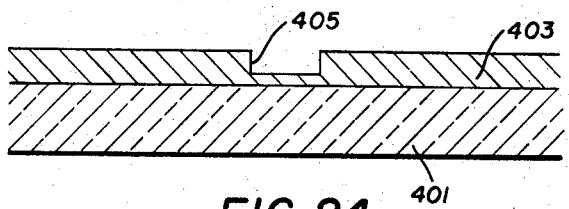
Figure 25:
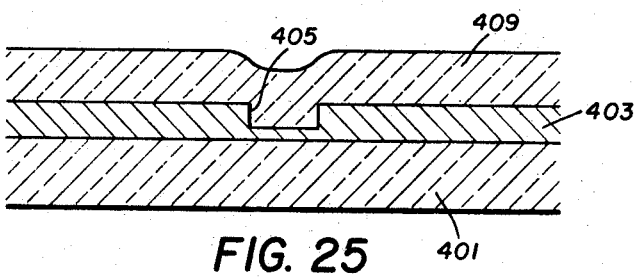

As an illustration of the method and structure connected with vapor phase deposition of the dielectric material upon a semiconductor, consider the sequential operations represented schematically in FIGS. 24–27. In FIG. 24, a silicon substrate 401 is covered with a surface film 403 of silicon dioxide. Such a silicon dioxide film may be formed by oxidation of the silicon surface or by vapor phase deposition of silicon dioxide, both techniques being well-known in the art. In one region, the silicon dioxide film has been etched to a greatly reduced thickness, thereby defining the trench 405. Note that only a small thickness of film of silicon dioxide separates the bottom of trench 405 from the underlying upper surface of silicon substrate 401. The structure of FIG. 24 is placed in a reactor and raised to a temperature of about 1000° C.–1200° C. A mixture of yttrium chloride vapor, ferric chloride vapor and oxygen is passed through the reactor. YIG is deposited upon the upper surface of the silicon dioxide film 403, to form a layer of YIG 409. The resulting structure, after the YIG deposition, is schematically illustrated in FIG. 25. Additional aspects of the vapor phase deposition of YIG may be found in U.S. Pat. 3,131,082.

Figure 26:
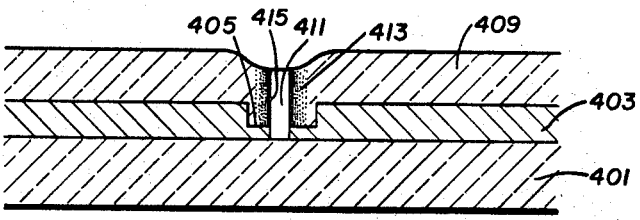

A small hole 411 is drilled with an electron beam to pass through the thickness of the YIG layer 409 and the thickness of the silicon dioxide film 403 underlying the trench 405. The depth of the hole 411 is sufficient to expose an upper surface region of the silicon substrate 401. Thereafter, the resulting structure is immersed in a plating bath and electroless plating is conducted. The reduced, relatively metallic regions 413 of the YIG material, which extend inwardly a short distance from the boundary of the hole drilled by the electron beam, become plated with a metal layer 415. The structure at this point in the processing is illustrated in FIG. 26.

Figure 27:
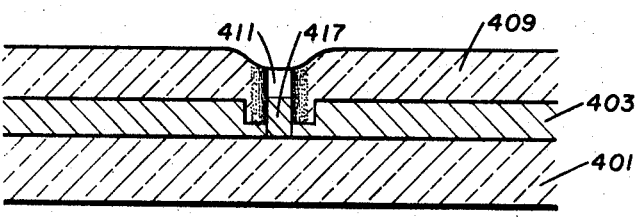

Aluminum or other metal is deposited, as by evaporation technique, into the hole 411 to define metal filling 417 (FIG. 27). Thereafter, the resulting structure is heated to a temperature of on the order of about 500° C. This causes the aluminum metal filling 417 to bond intimately with the reduced surface regions of the YIG material bounding the hole, or, if the hole has been plated, to bond with the plate. In addition, the aluminum metal filling 417 bonds with the silicon substrate. The bonds formed are more than mechanical in nature—eutectics are other bonds of a chemical nature being formed between the metal filling and the other materials involved. Accordingly, the resulting structure comprises a YIG layer firmly bonded to a silicon substrate; moreover, the structure includes a good ohmic contact between the silicon and the conductive (preferably plated) path along the bonding structures of the hole.

Using the plating technique described above and analogous procedures, a wide range of operations may be performed to make various composite structures of semiconductor material and reducible dielectric bodies. For example, referring to FIG. 28, a composite body 429 is illustrated which includes a silicon substrate 431 having an upstanding rectangular central region 435. Spaced apart YIG shoulder portions 437 and 439 are disposed over a silicon dioxide layer 441 on the upper surfaces of substrate 435. Autogenously formed electrical components 443 are located in the YIG shoulders 437 and 439. These components may be, for example inductors.

The composite body 429 may be formed by the vapor phase deposition of YIG material upon the silicon dioxide covered substrate 431. Material depositing on the upper surface of the upstanding region 435 of substrate 431 is removed, as by slicing or lapping. Thereafter, localized energy is used to autogenously form the components 443, together with such conductive paths as are required on the surface. Plating may be conducted if desired. While it is not illustrated in FIG. 28, it will be apparent in light of prior explanations herein that a hole might be drilled with an electron beam through the YIG material to provide both better bonding of the YIG to the substrate and electrically conductive connection to desired underlying regions in the substrate.

FIG. 29 illustrates yet another structure made by vapor phase deposition technique. The silicon substrate 445 carries on it the vapor deposited YIG layer 447. A portion of the vapor deposited YIG layer 447 is etched out and an epitaxially deposited silicon layer 449 is disposed thereon over exposed surface of silicon substrate 445. The epitaxially deposited silicon layer 449 has etched slotlike portions along its upper surface which carry the spaced apart, vapor deposited YIG regions 451. It will be noticed that the formation of this structure involves the epitaxial deposition of one layer of silicon after some YIG material has already been laid, and in addition, involves a subsequent deposition of YIG material from the vapor phase after the silicon layer has been expitaxially deposited. It will be appreciated that a plurality of epitaxial depositions of silicon and vapor phase depositions of YIG can be conducted to make structures having a variety of desired configurations.

Other methods may be used to join the reducible dielectric body and a semiconductor material together to form a composite structure. One such method is isostatic pressing. This method is illustrated in FIG. 30 which illustrates the YIG body 461 and the silicon body 463 in intimate contact, pressed together by a substantial force, e.g. a force of suitable magnitude to provide about 60,000 p.s.i.a. between the contacting surfaces of the bodies. Such force may be provided by isostatic pressing techniques, known in the art, and is schematically illustrated in FIG. 30 by the opposed force arrowheads F and F', applied to the bodies 461 and 463, respectively. A joinder between the bodies 461 and 463 results from the isostatic pressing operation. If desired, a stronger, supplemental bond is made between the bodies by drilling a hole through the YIG body, as by an electron beam, with a concentrated energy source to partially reduce adjoining areas defining the hole. Thereafter, aluminum may be deposited in the hole, e.g. by evaporation techniques. If desired, plating of the reduced YIG regions bounding the hole may be conducted prior to the deposit of aluminum. The composite body is heated, for example, to about 600° C., to cause the aluminum to intimately join with the silicon and the reduced YIG regions (or plated reduced YIG regions, if plating is applied). In this manner, a conductive path is provided which extends through the YIG body to make good electrical contact with the silicon body. The technique of drilling the hole, plating, and depositing aluminum is analogous to the technique illustrated in FIGS. 26 and 27 and previously described herein.

Yet another method of bonding reducible dielectric material to semiconductor material is illustrated in FIGS. 31 and 32. In FIG. 31, body 481 carries a thin film 483 of aluminum on its upper surface. Formation of the aluminum film may be conducted, for example, by evaporation technique, well-known in the art. Thereafter, the body 481, bearing the film 483, is heated to a temperature no lower than on the order of about 100° C. At such temperature (150° C., for a specific example) the aluminum material in intimate contact with the surface of the YIG forms bonds with some of the oxygen atoms in the YIG structure. At least to a degree, oxygen defect structure results in the YIG material in the boundary region with the aluminum, i.e. at least a small amount of reduction occurs in this region. In any event, a strong bond is formed between the aluminum and the YIG body. It is pointed out that the structure at this point, as represented in FIG. 31, has utility in many instances apart from subsequent joinder with a silicon body or other semiconductor material. For example, by the technique described in connection with FIG. 31, various strip patterns of metals, e.g. aluminum, may be deposited in predetermined regions of reducible dielectric bodies such as YIG bodies. When selective metal deposition in accordance with a predetermined pattern is desired, masking technique may be employed. For example, photosensitive film may be applied to the surface of the dielectric body, followed by exposure in accordance with a desired pattern and selective removal to expose a desired pattern. Such masking techniques are well-known in the art.

FIG. 32 illustrates the YIG body 481 joined to the silicon body 485 by means of and through the aluminum layer 483. This joinder may be accomplished by simply pressing the face of the aluminum layer 483 of the structure of FIG. 31 against a body of silicon 485 and heating to a temperature of on the order of about 500° C., for example, 550° C. A strong bond results between the aluminum and the silicon, apparently because of a eutectic formed in boundary regions between these materials.

The techniques discussed in connection with FIGS. 31 and 32 may be applied in many situations and with other metals besides aluminum. In general, metals which have higher free energy compared to oxygen than does iron can be utilized.

Considering the inductor aspect of the present invention, a specific example of an inductor formed in a reducible dielectric body will now be given for purposes of illustration. The inductor is formed in a sheet of YIG material (resistivity of about $10^{12}$ ohms) about 25 mils in thickness. An electron beam is moved over the surface of the YIG material to form, by localized reduction, a coil of generally rectangular "spiral" configuration, i.e. one having convolutions of the general pattern illustrated for the inductors 231, 303, 313, and 323 of FIGS. 19 and 22. The depth of the coil paths formed by the electron beam is approximately 2 mils. The width of the paths is about 1 mil. The total path length is 85 inches. The inductor coil is formed with 103 turns. The distance between turns is approximately 1 mil. The inductor occupies a planar space of 0.41 inch x 0.41 inch. After "scribing" with the electron beam, the coil is plated with nickel, by electroless plating technique. It is found that the resulting coil has a resistance of approximately 27 ohms. The inductance of the coil is 20 microhenrys at frequency of 4 megacycles.

A second coil is made in the same type material and by the same technique previously described. The total path length is 2.05 inches, 13 turns being provided. The path depth is 1 mil, the width 1 mil, and the distance between turns is 1 mil. The planar space occupied is defined by a rectangle 0.08 inch x 0.08 inch. This coil (after plating) has an inductance of 0.2 microhenry.

FIG. 33 is a schematic top view of an inductor 501 in accordance with the present invention, showing one of many of a wide variety of spiral (the word "spiral" being used herein to include rectangular convolutions as well as those employing other geometry) configurations that may be employed in inductors in accordance with the present invention. Therein, the inductor coil 503, autogenously formed by an electron beam moved along YIG substrate 505, is of curved, convolutional configuration, winding inwardly and downwardly. The path 507 of the inductor coil 503 is schematically represented in FIG. 34. It will be appreciated that the trench cut during formation of inductor coil 503 becomes deeper as the path of the coil winds inwardly. The degree of exposure to and/or intensity of the electron beam is increased during formation of the coil in order to deepen the trench in this manner. The path of the coil 503, which lies along the bottom of the trench so formed, is preferentially plated with a metal, the bottom region of the trench being more conductive than the sides of the trench, which are not so greatly reduced as the bottom.

FIG. 35 schematically represents, in section, a fragmentary portion 511 typical of a solid-state transformer in which the windings 513 have been autogenously formed in the YIG body 515.

FIG. 36 schematically represents, in section, a different configuration of a solid-state transformer, wherein the transformer 517 has oppositely disposed, autogenously formed coils 519, oppositely staggered, which overlap in their distance of extension into the YIG body 521.

It should be noted that the various dielectric materials described in the introductory portions hereof, and which may be generalized by the formula $M_xY_{3-x}A_qFe_{5-q}O_{12}$, may be used for making inductors in accordance with the present invention. Such materials possess ferromagnetic properties, which make them ideal for most inductor applications.

An additional example of useful materials generally applicable to most aspects of the present invention, and of marked significance for some aspects, include ferrites other than the YIG and related materials previously mentioned having yttrium as a constituent.

The additional materials include the spinels, the hexagonal iron oxides, and the perovskite-type materials.

The spinels generally have the chemical formula $$M^{+2}Fe_2^{+3}O_4^{-2} \text{ or } M^{+2}O^{-2}Fe_2^{+3}O_3^{-2}$$

where M is a divalent metal ion, and the crystal structure is that possessed by the mineral spinel, $MgAl_2O_4$. The oxygen anions are physically the largest in the lattice; within the lattice two types of interstitial positions occur and these are occupied by the metallic cations. Examples of the important spinels are given in the following table:

TABLE I

| | Tetrahedral site | | Octahedral site | |
|---|---|---|---|---|
| | Radius A. | Occupant | Radius A. | Occupant |
| $NiFe_2O_4$ | 0.54 | $Fe^{+3}$ | 0.69 | $Ni^{+2}Fe^{+3}$ |
| $ZnFe_2O_4$ | 0.62 | $Zn^{+2}$ | 0.67 | $Fe^{+3}$ |
| $MgFe_2O_4$ | 0.54 | $Mg^{+2}Fe^{+3}$ | 0.69 | $Mg^{+2}Fe^{+3}$ |
| $CoFe_2O_4$ | 0.54 | $Fe^{+3}$ | 0.69 | $Co^{+2}Fe^{+3}$ |
| $MnFe_2O_4$ | 0.61 | $Mn^{+2}Fe^{+3}$ | 0.69 | $Mn^{+2}Fe^{+3}$ |
| $MgAl_2O_4$ | 0.60 | $Mg^{+2}$ | 0.55 | $Al^{+3}$ |

Generally the ferrites of the spinel-type will crystallize together, and it is common to find solid solutions of two or more, e.g. the structure $$Ni_{1-x}^{+2}Fe_x^{+2}Fe_2^{+3}O_4^{-2}$$

In this structure the divalent ion may be replaced by monovalent and trivalent ions, while still retaining the spinel structure. Thus $$(Li_{0.5}^+Fe_{0.5}^{+3})$$

$$Fe_2^{+3}O_4^{-2}$$

is a spinel. The trivalent ferrite ion may also be replaced, for example, by $Al^{+3}$, $Cr^{+3}$, or $$Ni_{0.5}^{+2}Ti_{0.5}^{+4}$$

and remain a spinel. Accordingly, the spinels may be represented by the formula: $A_{1-x}B_xFe_2O_4$, where $x$ ranges from 0 to 1. Note that even $Fe_3O_4$ can exist in the spinel structure:

$$Fe^{+2}Fe_2^{+3}O_4$$

Of the hexagonal iron oxides, the simplest material structurally is based on the molecule $BaFe_{12}O_{19}$ or $BaO \cdot 6Fe_2O_3$. Other structures are $$M_2BaFe_{16}O_{27}, \; M_2Ba_2Fe_{12}O_{22}, \; \text{and} \; M_2Ba_3Fe_{24}O_{41}$$

where M is a divalent ion which may be Mn, Co, Zn, Ni, Mg, or Fe.

The perovskite-type structure materials include the series $$La^{+3}Mn^{+3}O_3^{-2}\text{---}M^{+2}Mn^{+4}O_3^{-2}$$

whereby M is a large divalent ion (such as $Ca^{+2}$). In the unit cell of the perovskite structure the large cations $La^{+3}M^{+2}$ form simple cubic structures with the oxygen anions in the face-centre positions and with the small cations, e.g., manganese, in the body centre. This form is typical of the perovskite structure of compounds with the formula $ABO_3$ where the A and B cations each form a simple cubic sublattice.

The foregoing ferrites mentioned that do not contain yttrium are applicable, with varied degrees of effectiveness, to all the various aspects of the present invention.

Circuit board applications of the materials are generally most durable and practical in those instances where the resistivity of the material is high, for example, in excess of $10^{10}$ ohms; nevertheless materials of lower resistivity, e.g. $10^7$ ohms, may be utilized for certain specific circuit board applications.

The non-yttrium containing materials referred to above are particularly useful for making inductors in accordance with the present invention. Moreover, they may be joined to semiconductor bodies, as well as to metals in like manner to that described heretofore in this application.

The selective reduction of the materials disclosed herein may be conducted to vary the magnetic properties of material, as well as conductive properties. By varying degree of reduction to a predetermined degree, the desired magnetic properties may be obtained in a preselected region. Thus, a material may be reduced only to the extent that a relatively minor amount of change occurs, resulting in a structure having only a minor oxygen defect; it may be reduced to a radically altered structure; or it may be reduced to various intermediate structures between these extremes. If desired, a body of a ferrite material involved herein, including the yttrium containing compounds, as well as the spinel types, hexagonal iron oxide type, and perovskite-type may be selectively reduced to varying degrees in accordance with a predetermined plan. For example, spinel or YIG may be quite mildly selectively reduced in preselected regions to change the material's magnetic properties to a desired degree (as well as its conductivity) in the selected region. Thereafter, a subsequent reduction may be accomplished within preselected parts of the mildly reduced region to further vary the magnetic properties only of the preselected parts. A multiplicity of said successive reductions may be accomplished, if desired. Such reductions make use of the various techniques described herein, including the technique of localized reduction with an electron beam.

The localized reduction can be carried to a high degree of resolution by concentrating the energy source, e.g. the electron beam and combining it with an electrical-optical lens system. Thus resolutions from 1 micron to 0.1 micron can be obtained. This is of great importance because changes in these materials can be made with high resolution at selected regions. For example, small area contacts can be made and patterns and geometry altered to a degree which is not readily or easily accomplished with present methods known in the state of the art. In addition, interconnections can be made in the same manner; micro-miniature circuits can be constructed in the materials hereof, in combination with semiconductor chips as described previously herein.

By successive reduction, it will be apparent that many useful structures may be formed. To illustrate, a YIG or spinel substrate may be mildy selectively reduced in a desired region to alter the magnetic properties of that region to a desired degree, e.g. by introduction of an oxygen defect structure. Thereafter, an inductor may be formed in the body by scribing with an electron beam as previously explained herein to define an inductor coil, the beam intensity and exposure being such that a greater degree of reduction is accomplished than in the first instance. On preferential plating of the more highly reduced inductor coil pattern, an inductor is formed. The plating may be preferentially accomplished electrolessly, for example, with nickel, silver, or gold. The end result is an inductor having a core with magnetic properties of the desired degree, as determined by the preliminary selective reduction step. By such procedures, a pair of coils may be disposed to define a transformer with a core having desired properties, for example, the desired permeability.

The change of magnetic properties referred to above may be applied to making various structure, e.g. magnetic amplifiers, pulse generators, multivibrators, storage elements in a computer system, semiconductor switching elements, and a variety of structures employing thin magnetic films.

Magnetic properties which may be affected in various degrees and instances by reduction include the following: ferrimagnetism, paramagnetic susceptibilities, spontaneous magnetization, magnetization curves, saturation moments, magnetocrystalline anisotropy and shape-anisotropy.

A simple tuning circuit and a transformer coupled tuning circuit were illustrated previously herein to describe circuits which may be provided in composite bodies of reducible dielectric and semiconductor material in accordance with one aspect of the present invention. It should be appreciated that an extremely large number of composite circuits and applications of composite reducible dielectric-semiconductor bodies are made possible by the present invention and the circuits and applications illustrated should, accordingly, be considered merely by way of example, and not as limiting. Other important circuit applications of the composite body aspect of this invention take advantage of the ferromagnetic properties of YIG, and the analogous materials referred to herein. Isolators, circulators, strip-line transmission devices, limiters, and a variety of devices having utility, for example, in microwave applications, are made possible by the characteristics of certain reducible dielectric material (e.g. YIG and the other reducible dielectric materials referred to herein). Consider, for example, a composite body in accordance with the present invention, provided by the joinder of a YIG chip and a silicon chip. Such a body effectively couples the electronic functions of the silicon chip to the desirable ferromagnetic properties of the YIG chip. Such a property, for example, is spin resonance.

By way of an example of one of the multiplicity of modifications which may be made within the framework and scope of this invention, the hole 125 of the embodiment of FIG. 10 could be made to extend partially into or entirely through the body 122 by the electron beam or concentrated energy source technique which is an aspect of the invention.

The phrase "reducing environment," as used herein, including the claims, is intended to refer to an environment in which reduction may be effectively accomplished. Since vacuum conditions provide such an environment, it is intended that vacuum conditions be included within the meaning of the phrase "reducing environment" along with the many other conditions supporting reduction.

The term "autogenously," as used herein, including the claims, is intended to convey the concept that a zone, portion, etc. "originates within or is derived from the same individual" (Webster's Seventh New Collegiate Dictionary), i.e., derived from the same item referred to as having portions "autogenously" formed therefrom.

By the use of the term "crystalline" herein (which is sometimes used in conjunction with the word "unitary," particularly in the claims hereof) it is not intended to imply that the dielectric material referred to must have monocrystalline structure. Accordingly, the term "crystalline" does not exclude polycrystalline structure, which is operative, e.g., polycrystalline YIG functions quite well in the practice of this invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. The process of preparing a body having conductive and dielectric portions comprising:
    (a) selectively reducing a surface zone of a dielectric body having the formula

    $$M_xY_{3-x}A_qFe_{5-q}O_{12}$$

wherein M is selected from the group consisting of aluminum, gallium, indium, thallium, lanthanum, scandium and the rare earth elements and $x$ is any number between 0 and 3, wherein A is selected from the group consisting of aluminum, gallium, indium, thallium, lanthanum, scandium and the rare earth elements and $q$ is a number between 0 and 5, and wherein $x$ is always less than 3 when $q$ equals 5 and $q$ is always less than 5 when $x$ equals 3; and
    (b) adhering a conductor to the selectively-reduced surface zone.

2. The process of claim 1 in which said body is yttrium iron garnet.

3. The process of claim 2 in which said conductor comprises at least a major proportion of graphite.

4. The process of claim 2 in which said conductor is metal.

5. The process of claim 4 in which said metal comprises at least a major proportion of iron.

6. The process of claim 4 in which said metal comprises at least a major proportion of nickel.

7. The process of claim 4 in which said metal is brass.

8. The process of claim 4 in which said metal comprises at least a major proportion of copper.

9. The process of claim 6 in which said adhering is accomplished by plating a metal on said comparatively metallic, conductive surface zone.

10. The process of joining a crystalline body of yttrium iron garnet to a conductor comprising:
    (a) heating a surface region of said body in a reducing environment to a temperature not lower than about 700° C. until a surface reduction zone comprising at least two contiguous layers of variable composition, the outermost being more metallic, has formed in said surface region;
    (b) causing the contact of a conductor with said outermost layer at an effective temperature substantially elevated above ambient temperature to form a joint between said outermost layer and said conductor; and
    (c) cooling the joined layer and conductor to ambient temperature.

11. The process of claim 10 in which said conductor is metal.

12. The process of claim 10 in which said conductor is graphite.

13. The process of claim 10 in which the step of causing said conductor to contact said outermost layer is accomplished after said outermost layer has formed by thereafter moving said conductor into contact with said layer.

14. The process of claim 10 in which the step of causing the contact of said conductor and said outermost layer is accomplished by contacting said conductor with the outer surface of said surface of said body and maintaining contact therebetween while said surface reduction zone is formed.

References Cited

UNITED STATES PATENTS 2,599,751  6/1952  Federspiel _____ 29—472.9
2,957,238  10/1960  Harvey et al. _____ 29—472.9
3,022,195  2/1962  Hackley et al. _____29—472.9X
3,056,881  10/1962  Schwarz _____ 117—93.3

JOHN F. CAMPBELL, Primary Examiner

R. J. SHORE, Assistant Examiner

U.S. Cl. X.R.

29—472.9, 473.1; 117—212, 213